US012633957B2

(12) United States Patent　　　　(10) Patent No.:　US 12,633,957 B2
Tsuchida et al.　　　　　　　　　　　(45) **Date of Patent:　*May 19, 2026**

(54) RADIO FREQUENCY MODULE

(71) Applicant: Murata Manufacturing Co., Ltd., Nagaokakyo (JP)

(72) Inventors: Shigeru Tsuchida, Nagaokakyo (JP); Kyohei Morita, Nagaokakyo (JP); Yoshito Matsumura, Nagaokakyo (JP); Hiroki Shounai, Nagaokakyo (JP); Ken Nankou, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 18/499,378

(22) Filed: Nov. 1, 2023

(65) Prior Publication Data

US 2024/0214024 A1　　Jun. 27, 2024

(30) Foreign Application Priority Data

Dec. 21, 2022　(JP) ................................. 2022-204778

(51) Int. Cl.
H04B 1/40　　　　(2015.01)
(52) U.S. Cl.
CPC ...................................... H04B 1/40 (2013.01)
(58) Field of Classification Search
CPC . H04B 1/40; H04B 1/38; H04B 1/006; H04B 2001/0408; H04B 1/00; H04B 1/0057; H04B 1/04; H04B 1/44; H04B 1/50; H04B 1/0475; H04B 1/0458; H04B 1/401; H04B 1/48; H04B 17/101; H04B 2001/0416
USPC .......................................................... 455/73
See application file for complete search history.

(56) References Cited

U.S. PATENT DOCUMENTS

2018/0212574 A1* 7/2018 Ko ........................... H03F 3/245
2021/0336642 A1* 10/2021 Matsumoto ............ H04B 1/006

FOREIGN PATENT DOCUMENTS

JP　　　2021-158556 A　　10/2021

* cited by examiner

*Primary Examiner* — Ajibola A Akinyemi
(74) *Attorney, Agent, or Firm* — XSENSUS LLP

(57) ABSTRACT

A radio frequency module includes a module substrate having main surfaces that are opposite to each other, a plurality of external connection terminals that are disposed on the main surface, a power amplifier circuit that is disposed on the main surface and supports a first power class, a power amplifier circuit that is disposed on the main surface and supports a second power class, a transformer that is connected to the power amplifier circuit and disposed on the main surface, and a transformer that is connected to the power amplifier circuit and disposed on the main surface. The second power class is defined by a maximum output power higher than a third power class. The first power class is defined by a maximum output power lower than the second power class or the same maximum output power as the second power class.

20 Claims, 14 Drawing Sheets

RADIO FREQUENCY MODULE

CROSS-REFERENCE TO RELATED APPLICATION

This application claims priority to Japanese Patent Application No. JP 2022-204778 filed on Dec. 21, 2022. The entire contents of the above-identified application, including the specifications, drawings and claims, are incorporated herein by reference in their entirety.

BACKGROUND OF THE DISCLOSURE

1. Field of the Disclosure

The present disclosure relates to a radio frequency module.

2. Description of the Related Art

In Japanese Unexamined Patent Application Publication No. 2021-158556, a radio frequency module including a plurality of transformers is disclosed.

SUMMARY OF THE DISCLOSURE

However, in the known technique mentioned above, isolation may be insufficient to support power class (for example, power class 1, 1.5, 2, or the like) that allows a higher maximum output power.

Accordingly, the present disclosure provides a radio frequency module including a plurality of transformers and capable of improving isolation regarding the transformers.

A radio frequency module according to an aspect of the present disclosure includes a module substrate having a first main surface and a second main surface that are opposite to each other; a plurality of external connection terminals that are disposed on the second main surface; a first power amplifier circuit that is disposed on the first main surface and supports a first power class; a second power amplifier circuit that is disposed on the first main surface and supports a second power class; a first transformer that is connected to the first power amplifier circuit and disposed on the first main surface; and a second transformer that is connected to the second power amplifier circuit and disposed on the second main surface. The second power class is defined by a maximum output power higher than power class 3. The first power class is defined by a maximum output power lower than the second power class or the same maximum output power as the second power class.

With a radio frequency module according to an aspect of the present disclosure, isolation regarding transformers can be improved.

DESCRIPTION OF THE PREFERRED EMBODIMENTS

Figure 1:
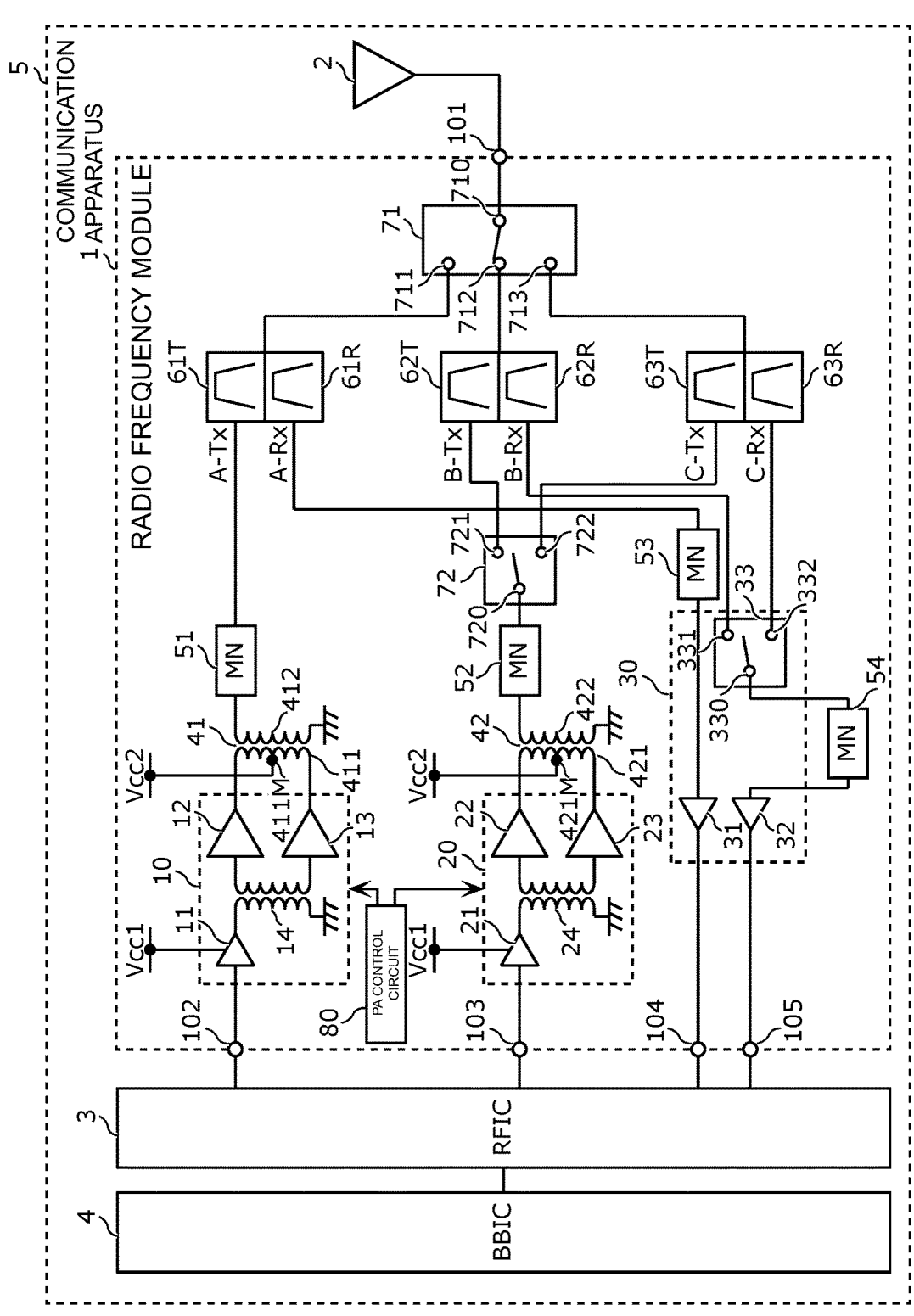
FIG. 1 is a circuit configuration diagram of a communication apparatus according to a first embodiment.

Hereinafter, embodiments of the present disclosure will be described in detail with reference to drawings. The embodiments described below each illustrate a comprehensive or specific example. Numerical values, shapes, materials, component elements, arrangements of the component elements, manners in which the component elements are connected, and so on illustrated in the embodiments described below are merely examples and are not intended to limit the present disclosure.

The drawings are schematic diagrams in which emphasis, omission, or ratio adjustment is performed in an appropriate manner in order that the present disclosure is illustrated. The drawings are not necessarily strictly illustrated and may differ from actual shapes, positional relationships, and ratios. In the drawings, substantially the same configurations are denoted by the same reference signs, and repetitive description may be omitted or simplified.

In the following drawings, an x-axis and a y-axis are axes that are orthogonal to each other on a plane parallel to a main surface of a module substrate. Specifically, in the case where the module substrate has a rectangular shape in plan view, the x-axis is parallel to a first side of the module substrate and the y-axis is parallel to a second side orthogonal to the first side of the module substrate. Furthermore, a z-axis is an axis perpendicular to the main surface of the module substrate. A positive direction of the Z-axis indicates an upward direction, and a negative direction of the z-axis indicates a downward direction.

In a circuit configuration, "being connected" does not necessarily represent being directly connected by a connection terminal and/or a wire conductor but also includes being electrically connected with another circuit element interposed therebetween. "Being directly connected" means being directly connected by a connection terminal and/or a wire conductor with no circuit element interposed therebetween. "C is connected between A and B" means that C is connected to both A and B between A and B, and more specifically, that one end of C is connected to A and the other end of C is connected to B.

In component arrangement, "a component is disposed at a substrate" includes the state in which a component is disposed on a main surface of a substrate and the state in which a component is disposed inside a substrate. "A component is disposed on a main surface of a substrate" includes the state in which a component is disposed in contact with a main surface of a substrate and the state in which a component is disposed above a main surface without being in contact with the main surface (for example, the component is stacked on another component that is disposed in contact with the main surface). Furthermore, "a component is disposed on a main surface of a substrate" may include the case where a component is disposed in a recessed part formed in a main surface. "A component is disposed inside a substrate" includes the state in which a component is encapsulated in a module substrate, the state in which part of a component is not covered with a substrate although the entire component is disposed between both the main surfaces of the substrate, and the state in which only part of a component is disposed inside a substrate.

Furthermore, in component arrangement, "A is disposed farther away from C than B is" means that the distance between A and C is longer than the distance between B and C. The "distance between A (B) and C" represents the length of the shortest line segment among a plurality of line segments each connecting a randomly selected point in A (B) to a randomly selected point in C. "A is disposed between B and C" means that at least one of a plurality of line segments each connecting a randomly selected point in B to a randomly selected point in C passes through A.

A "transmission band" represents a frequency band used for transmission in a communication apparatus. Furthermore, a "reception band" represents a frequency band used for reception in the communication apparatus. For example, different frequency bands are used as a transmission band and a reception band in the case of frequency division duplex (FDD), and the same frequency band is used as a transmission band a reception band in the case of time division duplex (TDD). In particular, in the case where a communication apparatus functions as a user terminal (user equipment: UE) of a cellular communication system, in the case of FDD, an uplink operation band is used as a transmission band and a downlink operation band is used as a reception band. In contrast, in the case where a communication apparatus functions as a base station (BS) of a cellular communication system, in the case of FDD, a downlink operation band is used as a transmission band and an uplink operation band is used as a reception band.

A pass band of a filter circuit is a part of a frequency spectrum that is transmitted through the filter circuit and is defined as a frequency band in which output power is not attenuated from the maximum output power by 3 dB or more. Thus, an upper limit frequency and a lower limit frequency of a pass band of a band pass filter circuit are frequencies at points where output power is attenuated from the maximum output power by 3 dB.

A "terminal" represents a point at which a conductor inside an element terminates. In the case where the imped- ance of a conductor between elements is sufficiently low, a terminal is not necessarily construed as a single point and is also construed as a point in the conductor between the elements or the entire conductor.

Terms indicating relationships between elements, such as "parallel" and "perpendicular", terms indicating shapes of elements, such as "rectangular", and numerical ranges are not strict expressions but also represent substantially equiva- lent ranges, which include, for example, a difference of a few percent.

First Embodiment

A first embodiment will be described below.
1.1 Circuit Configuration of Communication Apparatus 5
First, a circuit configuration of a communication appara- tus 5 according to this embodiment will be described with reference to FIG. 1. FIG. 1 is a circuit configuration diagram of the communication apparatus 5 according to this embodi- ment.

FIG. 1 illustrates illustrative circuit configurations of the communication apparatus 5 and a radio frequency module 1, and the communication apparatus 5 and the radio frequency module 1 may be implemented by using any of a wide variety of circuit implementations and circuit techniques. Hence, description of the communication apparatus 5 and the radio frequency module 1 provided below should not be construed as being limiting in any way.

The communication apparatus 5 corresponds to an UE in a cellular communication system and is typically a mobile phone, a smartphone, a tablet computer, a wearable device, or the like. The communication apparatus 5 may be an Internet of Things (IoT) sensor device, a medical/healthcare device, a vehicle, an unmanned aerial vehicle (UAV) (a so-called drone), or an automated guided vehicle (AGV). Furthermore, the communication apparatus 5 may be used as a BS in the cellular communication system.

As illustrated in FIG. 1, the communication apparatus 5 includes the radio frequency module 1, an antenna 2, a radio frequency integrated circuit (RFIC) 3, and a baseband inte- grated circuit (BBIC) 4.

The radio frequency module 1 is capable of transferring radio frequency signals to and from the antenna 2 and the IC 3. The internal configuration of the radio frequency module 1 will be described later.

The antenna 2 is connected to an antenna connection terminal 101 of the radio frequency module 1. The antenna 2 is capable of transmitting a radio frequency signal output from the radio frequency module 1 and capable of receiving a radio frequency signal from the outside and then output- ting the radio frequency signal to the radio frequency module 1. The antenna 2 is not necessarily included in the communication apparatus 5. Furthermore, the communica- tion apparatus 5 may further include, in addition to the antenna 2, one or more antennas.

The RFIC 3 is an example of a signal processing circuit that processes a radio frequency signal. Specifically, the RFIC 3 is capable of performing signal processing, such as up-conversion, for a transmission signal input from the BBIC 4 and outputting a radio frequency transmission signal generated by the signal processing to a transmission path of the radio frequency module 1. Furthermore, the RFIC 3 may include a controller that controls a switch, an amplifier circuit, and the like included in the radio frequency module 1. Part of or the entire function of the RFIC 3 as a controller may be implemented outside the RFIC 3 or may be imple- mented on, for example, the BBIC 4 and/or the radio frequency module 1.

The BBIC 4 is a baseband signal processing circuit that performs signal processing using an intermediate frequency band that is lower than frequencies of radio frequency signals transmitted from the radio frequency module 1. For example, image signals for image display and/or audio signals for conversation via a speaker are used as signals processed by the BBIC 4. The BBIC 4 is not necessarily included in the communication apparatus 5.

1.2 Circuit Configuration of Radio Frequency Module 1

Next, a circuit configuration of the radio frequency module 1 will be described with reference to FIG. 1. The radio frequency module 1 includes power amplifier circuits 10 and 20, a low noise amplifier circuit 30, transformers 41 and 42, matching circuits (matching networks: MNs) 51 to 54, filter circuits 61T, 61R, 62T, 62R, 63T, and 63R, switch circuits 71 and 72, a power amplifier (PA) control circuit 80, an antenna connection terminal 101, radio frequency input terminals 102 and 103, and radio frequency output terminals 104 and 105. Component elements of the radio frequency module 1 will be described below in order.

The antenna connection terminal 101 is an external connection terminal of the radio frequency module 1, is connected to the antenna 2 outside the radio frequency module 1, and is connected to the switch circuit 71 inside the radio frequency module 1.

The radio frequency input terminals 102 and 103 are external connection terminals of the radio frequency module 1, are connected to the RFIC 3 outside the radio frequency module 1, and are connected to the power amplifier circuits 10 and 20, respectively, inside the radio frequency module 1. In this embodiment, the radio frequency input terminal 102 is capable of receiving a transmission signal of band A from the RFIC 3, and the radio frequency input terminal 103 is capable of receiving transmission signals of band B and band C from the RFIC 3.

The radio frequency output terminals 104 and 105 are external connection terminals of the radio frequency module 1, are connected to the RFIC 3 outside the radio frequency module 1, and are connected to the low noise amplifier circuit 30 inside the radio frequency module 1. In this embodiment, the radio frequency output terminal 104 is capable of supplying a reception signal of the band A to the RFIC 3, and the radio frequency output terminal 105 is capable of supplying reception signals of the band B and the band C to the RFIC 3.

The power amplifier circuit 10 is an example of a first power amplifier circuit and is a differential-amplifier-type power amplifier circuit. The power amplifier circuit 10 supports a first power class and is capable of obtaining output signals, as differential signals, with energies larger than those of input signals, by using power supply voltages Vcc1 and Vcc2 supplied from power supplies (not illustrated in the drawing).

Power class is a classification of the output power of a terminal defined by the maximum output power, and a power class with a smaller value allows a higher maximum output power. For example, in the case of the 3rd Generation Partnership Project (3GPP (registered trademark)), the maximum output power of power class 1 is 31 dBm, the maximum output power of power class 1.5 is 29 dBm, the maximum output power of power class 2 is 26 dBm, the maximum output power of power class 3 is 23 dBm, and the maximum output power of power class 5 is 20 dBm.

The maximum output power of a terminal is defined by the maximum output power at an antenna end. The maximum output power of a UE is measured using a method defined by 3GPP or other methods. For example, in FIG. 1, the maximum output power is measured by measuring the power radiated from the antenna 2. Instead of measuring radiated power, the maximum output power of the antenna 2 may be measured by providing a terminal near the antenna 2 and connecting a measurement device (for example, a spectral analyzer) to the terminal.

A power class supported by a power amplifier can be identified based on the maximum output power of the power amplifier. For example, the maximum output power of a power amplifier supporting the power class 2 is higher than 26 dBm.

The first power class is a power class defined by a maximum output power lower than a second power class, which will be described later, or the same maximum output power as the second power class. In this embodiment, a power class defined by a maximum output power lower than the second power class is used as the first power class. More typically, the power class 3 is used as the first power class.

The power amplifier circuit 10 includes power amplifiers 11 to 13 and a transformer 14 and is capable of converting and amplifying a transmission signal (single-end signal) of the band A into differential signals.

The power amplifier 11 configures an input stage (may be called a drive stage) of a multi-stage amplifier circuit and includes one or more amplifier transistors. An input end of the power amplifier 11 is connected to the radio frequency input terminal 102, and an output end of the power amplifier 11 is connected to the transformer 14. The power amplifier 11 is capable of amplifying a single-end signal.

The power amplifier 12 configures an output stage (may be called a power stage) of the multi-stage amplifier circuit and includes one or more amplifier transistors. An input end of the power amplifier 12 is connected to the transformer 14, and an output end of the power amplifier 12 is connected to the transformer 41. The power amplifier 12 is capable of amplifying one of the differential signals.

The power amplifier 13 configures an output stage of the multi-stage amplifier circuit and includes one or more amplifier transistors. An input end of the power amplifier 13 is connected to the transformer 14, and an output end of the power amplifier 13 is connected to the transformer 41. The power amplifier 13 is capable of amplifying the other one of the differential signals.

The transformer 14 includes a primary coil and a secondary coil that can be coupled to the primary coil. One end of the primary coil is connected to the power amplifier 11, and the other end of the primary coil is connected to the ground. One end of the secondary coil is connected to the power amplifier 12, and the other end of the secondary coil is connected to the power amplifier 13. With this connection arrangement, the transformer 14 is capable of dividing a signal received from the power amplifier 11 into two signals whose phases are opposite to each other. That is, the transformer 14 is capable of converting a single-end signal into differential signals.

The power amplifier circuit 20 is an example of a second power amplifier circuit and is a differential-amplifier-type power amplifier circuit. The power amplifier circuit 20 supports the second power class and is capable of obtaining output signals, as differential signals, with energies larger than those of input signals, by using the power supply voltages Vcc1 and Vcc2 supplied from power supplies (not illustrated in the drawing).

The second power class is a power class defined by a maximum output power higher than the power class 3. In this embodiment, for example, the power class 1, 1.5, or 2 is used as the second power class. More typically, the power class 2 is used as the second power class.

In this embodiment, the combination of the first power class and the second power class is not limited to the combination of the power class 3 and the power class 2. For example, the combination of the first power class and the second power class may be the combination of the power class 2 and the power class 1.5.

The power amplifier circuit 20 includes power amplifiers 21 to 23 and a transformer 24 and is capable of converting and amplifying transmission signals (single-end signals) of the band B and the band C into differential signals.

The power amplifier 21 configures an input stage of a multi-stage amplifier circuit and includes one or more amplifier transistors. An input end of the power amplifier 21 is connected to the radio frequency input terminal 103, and an output end of the power amplifier 21 is connected to the transformer 24. The power amplifier 21 is capable of amplifying a single-end signal.

The power amplifier 22 configures an output stage of the multi-stage amplifier circuit and includes one or more amplifier transistors. An input end of the power amplifier 22 is connected to the transformer 24, and an output end of the power amplifier 22 is connected to the transformer 42. The power amplifier 22 is capable of amplifying one of the differential signals.

The power amplifier 23 configures an output stage of the multi-stage amplifier circuit and includes one or more amplifier transistors. An input end of the power amplifier 23 is connected to the transformer 24, and an output end of the power amplifier 23 is connected to the transformer 42. The power amplifier 23 is capable of amplifying the other one of the differential signals.

The transformer 24 includes a primary coil and a secondary coil that can be coupled to the primary coil. One end of the primary coil is connected to the power amplifier 21, and the other end of the primary coil is connected to the ground. One end of the secondary coil is connected to the power amplifier 22, and the other end of the secondary coil is connected to the power amplifier 23. With this connection arrangement, the transformer 24 is capable of dividing a signal received from the power amplifier 21 into two signals whose phases are opposite to each other. That is, the transformer 24 is capable of converting a single-end signal into differential signals.

The circuit configurations of the power amplifier circuits 10 and 20 are not limited to the circuit configurations mentioned above. For example, although input signals are single-end signals in the power amplifier circuits 10 and 20, the input signals may be differential signals. In this case, the power amplifier circuits 10 and 20 do not necessarily include the transformers 14 and 24, respectively, that convert single-end signals into differential signals. Furthermore, the power amplifier circuits 10 and 20 are not necessarily multi-stage amplifier circuits and do not necessarily include the power amplifiers 11 and 21, respectively. Furthermore, the power amplifier circuits 10 and 20 may each include a bias circuit (not illustrated in the drawing) or other circuits and may each include a capacitor (not illustrated in the drawing), an inductor (not illustrated in the drawing), and/or the like.

The low noise amplifier circuit 30 is an active circuit that is capable of obtaining an output signal with an energy larger than that of an input signal by using a power supply voltage supplied from a power supply (not illustrated in the drawing). The low noise amplifier circuit 30 includes low noise amplifiers 31 and 32 and a switch 33 and is capable of amplifying a reception signal with low noise. The low noise amplifier circuit 30 is not necessarily included in the radio frequency module 1.

The low noise amplifier 31 includes one or more amplifier transistors and is capable of amplifying a reception signal of the band A. An input end of the low noise amplifier 31 is connected to the filter circuit 61R, and an output end of the low noise amplifier 31 is connected to the radio frequency output terminal 104.

The low noise amplifier 32 includes one or more amplifier transistors and is capable of amplifying reception signals of the band B and the band C. An input end of the low noise amplifier 32 is connected to the switch 33, and an output end of the low noise amplifier 32 is connected to the radio frequency output terminal 105.

The switch 33 is connected between the low noise amplifier 32 and the filter circuits 62R and 63R. The switch 33 includes a terminal 330 connected to the low noise amplifier 32 with the matching circuit 54 interposed therebetween, a terminal 331 connected to the filter circuit 62R, and a terminal 332 connected to the filter circuit 63R. With this connection arrangement, the switch 33 is capable of connecting the terminal 330 exclusively to the terminals 331 and 332, for example, in accordance with a control signal from the RFIC 3. That is, the switch 33 is capable of switching connection of the low noise amplifier 32 between the filter circuits 62R and 63R. The switch 33 is, for example, a switch circuit of a single-pole double-throw (SPDT) type.

The circuit configuration of the low noise amplifier circuit 30 is not limited to the circuit configuration described above. For example, the low noise amplifier circuit 30 does not necessarily include the switch 33. Furthermore, for example, the low noise amplifier circuit 30 may further include a switch connected between the low noise amplifier 31, the filter circuit 61R, and another filter circuit (not illustrated in the drawing). Furthermore, the low noise amplifier circuit 30 may include a control circuit (not illustrated in the drawing) or other circuits and may include a capacitor (not illustrated in the drawing), an inductor (not illustrated in the drawing), and/or the like.

The transformer 41 is an example of a first transformer and includes a primary coil 411 and a secondary coil 412 that can be coupled to the primary coil 411. Both ends of the primary coil 411 are connected to corresponding output ends of the power amplifier circuit 10. Specifically, one end of the primary coil 411 is connected to the output end of the power amplifier 12, and the other end of the primary coil 411 is connected to the output end of the power amplifier 13. The power supply voltage Vcc2 is applied to a midpoint 411M of the primary coil 411. One end of the secondary coil 412 is connected to the filter circuit 61T with the matching circuit 51 interposed therebetween, and the other end of the secondary coil 412 is connected to the ground. With this connection arrangement, the transformer 41 is capable of combining two signals whose phases are opposite to each other, which have been received from the power amplifier circuit 10, into one signal. That is, the transformer 41 is capable of converting differential signals into a single-end signal.

The transformer 42 is an example of a second transformer and includes a primary coil 421 and a secondary coil 422 that can be coupled to the primary coil 421. Both ends of the primary coil 421 are connected to corresponding output ends of the power amplifier circuit 20. Specifically, one end of the primary coil 421 is connected to the output end of the power amplifier 22, and the other end of the primary coil 421 is connected to the output end of the power amplifier 23. The power supply voltage Vcc2 is applied to a midpoint 421M of the primary coil 421. One end of the secondary coil 422 is connected to the filter circuits 62T and 63T with the matching circuit 52 and the switch circuit 72 interposed therebetween, and the other end of the secondary coil 422 is connected to the ground. With this connection arrangement, the transformer 42 is capable of combining two signals whose phases are opposite to each other, which have been received from the power amplifier circuit 20, into one signal. That is, the transformer 42 is capable of converting differential signals into a single-end signal.

The matching circuit 51 is connected between the transformer 41 and the filter circuit 61T. The matching circuit 51 is configured to provide impedance matching between the transformer 41 and the filter circuit 61T and functions as an impedance matching network. The matching circuit 51 includes an inductor. The matching circuit 51 may include, instead of the inductor or in addition to the inductor, a capacitor. The matching circuit 51 is not necessarily included in the radio frequency module 1.

The matching circuit 52 is connected between the transformer 42 and the switch circuit 72. The matching circuit 52 is configured to provide impedance matching between the transformer 42 and the switch circuit 72 and functions as an impedance matching network. The matching circuit 52 includes an inductor. The matching circuit 52 may include, instead of the inductor or in addition to the inductor, a capacitor and may include a transformer. The matching circuit 52 is not necessarily included in the radio frequency module 1.

The matching circuit 53 is connected between the low noise amplifier 31 and the filter circuit 61R. The matching circuit 53 is configured to provide impedance matching between the low noise amplifier 31 and the filter circuit 61R and functions as an impedance matching network. The matching circuit 53 includes an inductor. The matching circuit 53 may include, instead of the inductor or in addition to the inductor, a capacitor and may include a transformer. The matching circuit 53 is not necessarily included in the radio frequency module 1.

The matching circuit 54 is connected between the low noise amplifier 32 and the switch 33. The matching circuit 54 is configured to provide impedance matching between the low noise amplifier 32 and the switch 33 and functions as an impedance matching network. The matching circuit 54 includes an inductor. The matching circuit 54 may include, instead of the inductor or in addition to the inductor, a capacitor and may include a transformer. The matching circuit 54 is not necessarily included in the radio frequency module 1.

The filter circuit 61T is an example of a first filter circuit and is a band pass filter circuit having a pass band including a transmission band of the band A (A-Tx). One end of the filter circuit 61T is connected to the transformer 41 with the matching circuit 51 interposed therebetween. The other end of the filter circuit 61T is connected to the antenna connection terminal 101 with the switch circuit 71 interposed therebetween. The filter circuit 61T is not necessarily included in the radio frequency module 1.

The filter circuit 61R is a band pass filter circuit having a pass band including a reception band of the band A (A-Rx). One end of the filter circuit 61R is connected to the low noise amplifier 31 with the matching circuit 53 interposed therebetween. The other end of the filter circuit 61R is connected to the antenna connection terminal 101 with the switch circuit 71 interposed therebetween. The filter circuit 61R is not necessarily included in the radio frequency module 1.

The filter circuit 62T is an example of a second filter circuit and is a band pass filter circuit having a pass band including a transmission band of the band B (B-Tx). One end of the filter circuit 62T is connected to the transformer 42 with the switch circuit 72 and the matching circuit 52 interposed therebetween. The other end of the filter circuit 62T is connected to the antenna connection terminal 101 with the switch circuit 71 interposed therebetween. The filter circuit 62T is not necessarily included in the radio frequency module 1.

The filter circuit 62R is a band pass filter circuit having a pass band including a reception band of the band B (B-Rx). One end of the filter circuit 62R is connected to the low noise amplifier 32 with the switch 33 and the matching circuit 54 interposed therebetween. The other end of the filter circuit 62R is connected to the antenna connection terminal 101 with the switch circuit 71 interposed therebetween. The filter circuit 62R is not necessarily included in the radio frequency module 1.

The filter circuit 63T is an example of a third filter circuit and is a band pass filter circuit having a pass band including a transmission band of the band C (C-Tx). One end of the filter circuit 63T is connected to the transformer 42 with the switch circuit 72 and the matching circuit 52 interposed therebetween. The other end of the filter circuit 63T is connected to the antenna connection terminal 101 with the switch circuit 71 interposed therebetween. The filter circuit 63T is not necessarily included in the radio frequency module 1.

The filter circuit 63R is a band pass filter circuit having a pass band including a reception band of the band C (C-Rx). One end of the filter circuit 63R is connected to the low noise amplifier 32 with the switch 33 and the matching circuit 54 interposed therebetween. The other end of the filter circuit 63R is connected to the antenna connection terminal 101 with the switch circuit 71 interposed therebetween. The filter circuit 63R is not necessarily included in the radio frequency module 1.

The bands A to C are frequency bands for communication systems established using radio access technology (RAT). Predetermined bands are defined in advance by standards organizations or other bodies (for example, 3GPP, Institute of Electrical and Electronics Engineers (IEEE), and the like). Examples of communication systems include a 5th generation new radio (5GNR) system, a long term evolution (LTE) system, a wireless local area network (WLAN) system, and the like.

In this embodiment, a frequency band for FDD included in a mid-band group (1427 MHz to 2200 MHz) is used as the band A, and frequency bands for FDD included in a high band group (2300 MHz to 2690 MHz) are used as the bands B and C. However, the bands A to C are not limited to the frequency bands mentioned above. For example, a frequency band(s) for TDD may be used as the band B and/or the band C. Furthermore, for example, a frequency band included in a band group different from the mid-band group may be used as the band A, and a frequency band(s) included in a band group(s) different from the high band group may be used as the band B and/or the band C.

The switch circuit 71 is connected between the antenna connection terminal 101 and the filter circuits 61T, 61R, 62T, 62R, 63T, and 63R. Specifically, the switch circuit 71 includes a terminal 710 connected to the antenna connection terminal 101, a terminal 711 connected to the filter circuits 61T and 61R, a terminal 712 connected to the filter circuits 62T and 62R, and a terminal 713 connected to the filter circuits 63T and 63R. With this connection arrangement, the switch circuit 71 is capable of connecting the terminal 710 to the terminals 711 to 713, for example, in accordance with control signals from the RFIC 3. That is, the switch circuit 71 is capable of connecting the filter circuits 61T, 61R, 62T, 62R, 63T, and 63R to the antenna connection terminal 101. The switch circuit 71 is, for example, a switch circuit of a multi-connection type.

The switch circuit 72 is connected between the transformer 42 and the filter circuits 62T and 63T. Specifically, the switch circuit 72 includes a terminal 720 connected to the transformer 42, a terminal 721 connected to the filter circuit 62T, and a terminal 722 connected to the filter circuit 63T. With this connection arrangement, the switch circuit 72 is capable of connecting the terminal 720 exclusively to the terminals 721 and 722, for example, in accordance with a control signal from the RFIC 3. That is, the switch circuit 72 is capable of switching connection of the power amplifier circuit 20 between the filter circuits 62T and 63T. The switch circuit 72 is, for example, a switch circuit of the SPDT type.

The PA control circuit 80 is capable of controlling the power amplifier circuits 10 and 20. Specifically, the PA control circuit 80 outputs, for example, in accordance with control signals from the RFIC 3, control signals for controlling the power amplifier circuits 10 and 20 to the power amplifier circuits 10 and 20. Thus, for example, bias currents supplied to the power amplifiers 11 to 13, bias currents supplied to the power amplifiers 21 to 23, and the like are controlled.

The circuit configuration of the radio frequency module 1 is merely illustrative and is not limited to the circuit configuration in FIG. 1. For example, the radio frequency module 1 may further include one or more filter circuits. In this case, the one or more filter circuits and the filter circuit 61T may be connected to the matching circuit 51 with a switch circuit (not illustrated in the drawing) similar to the switch circuit 72 interposed therebetween.

1.3 Implementation Example of Radio Frequency Module 1

Figure 2:
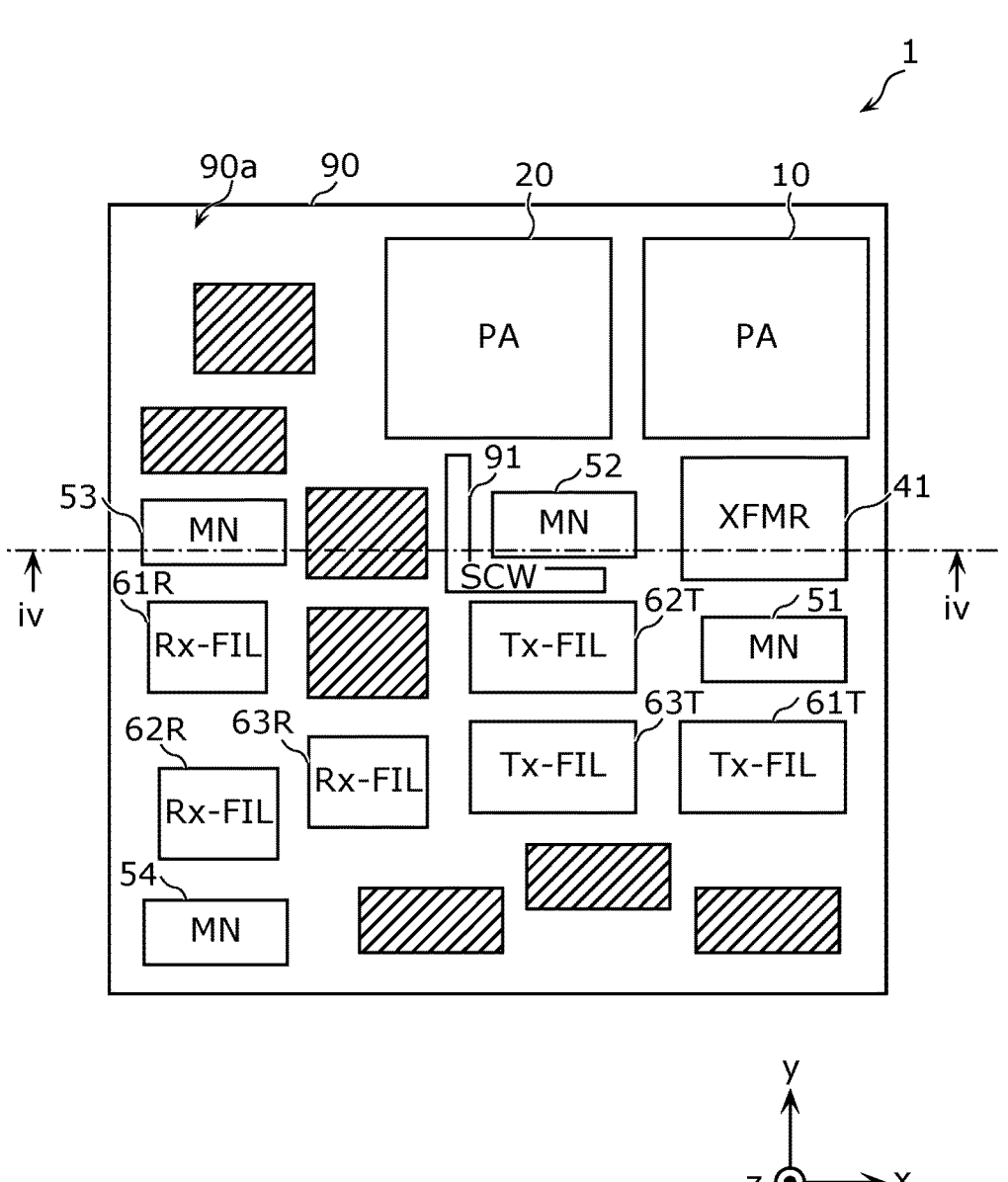
FIG. 2 is a plan view of a radio frequency module according to the first embodiment.
Figure 3:
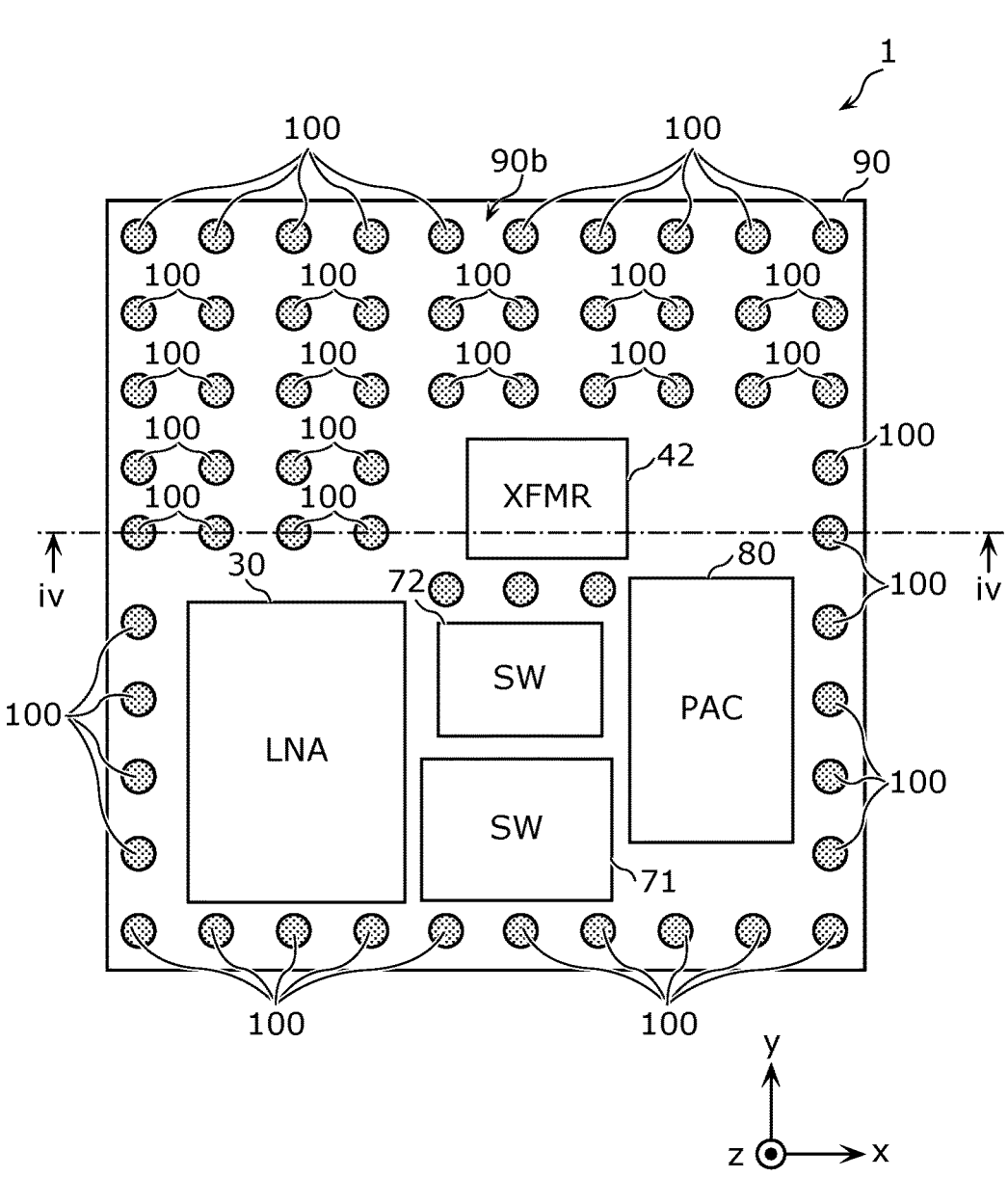
FIG. 3 is a plan view of the radio frequency module according to the first embodiment.
Figure 4:
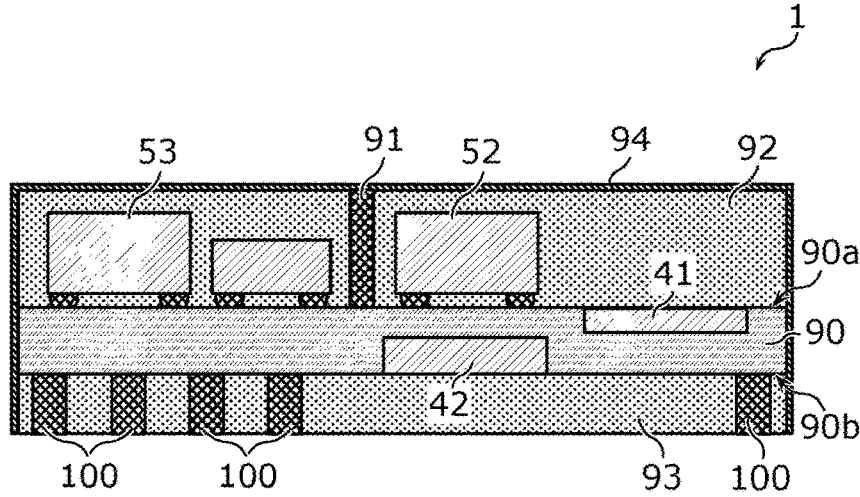
FIG. 4 is a cross-section view of the radio frequency module according to the first embodiment.

Next, an implementation example of the radio frequency module 1 having the circuit configuration described above will be described with reference to FIGS. 2 to 4. FIG. 2 is a plan view of the radio frequency module 1 according to this embodiment. FIG. 3 is a plan view of the radio frequency module 1 according to this embodiment and is a view assuming a main surface 90b side of a module substrate 90 is seen through from a z-axis positive side. FIG. 4 is a cross-section view of the radio frequency module 1 according to this embodiment. The cross section of the radio frequency module 1 in FIG. 4 is a cross section along line iv-iv in FIGS. 2 and 3.

In FIGS. 2 and 3, for easy understanding of the arrangement relationship between components, some components may be provided with letters representing the components. However, the actual components are not necessarily provided with the letters. Furthermore, in FIGS. 2 and 3, illustration of resin members 92 and 93 that cover a plurality of circuit components and a shield layer 94 that covers surfaces of the resin members 92 and 93 is omitted, and hatching is added to circuit components that are not essential to the present disclosure.

FIGS. 2 to 4 illustrate illustrative configurations of the radio frequency module 1, and the radio frequency module 1 may be implemented by using any of a wide variety of circuit implementations and circuit techniques. Hence, description of the radio frequency module 1 provided below should not be construed as being limiting in any way.

The radio frequency module 1 includes, in addition to the plurality of circuit components illustrated in FIG. 1, the module substrate 90, a metal member 91, resin members 92 and 93, a shield layer 94, and a plurality of external connection terminals 100.

The module substrate 90 has main surfaces 90a and 90b that are opposite to each other. The main surface 90a is an example of a first main surface and may be referred to as an upper surface or a front surface. The main surface 90b is an example of a second main surface and may be referred to as a lower surface or a rear surface. Wires (not illustrated in the drawings), via conductors (not illustrated in the drawings), and the like are formed inside the module substrate 90 and on the main surfaces 90a and 90b. In this embodiment, the module substrate 90 has a rectangular shape in plan view. However, the shape of the module substrate 90 is not limited to a rectangular shape.

For example, a low temperature co-fired ceramics (LTCC) substrate or a high temperature co-fired ceramics (HTCC) substrate having a multilayer structure including a plurality of dielectric layers, a substrate including components built therein, a substrate including a redistribution layer (RDL), a printed substrate, or the like may be used as the module substrate 90. However, the module substrate 90 is not limited the substrates mentioned above.

Components disposed on the main surface 90a of the module substrate 90 will be described mainly with reference to FIGS. 2 and 4.

The power amplifier circuits 10 and 20 (PA) are disposed on the main surface 90a of the module substrate 90. The power amplifier circuits 10 and 20 are implemented as semiconductor integrated circuits. For example, silicon-germanium (SiGe) or gallium arsenide (GaAs) is used as a semiconductor material. In this case, each of the power amplifiers 11 to 13 and 21 to 23 may include a heterojunction bipolar transistor (HBT). Gallium nitride (GaN) or silicon carbide (SiC) may be used as a semiconductor material. In this case, each of the power amplifiers 11 to 13 and 21 to 23 may be include a high electron mobility transistor (HEMT) or a metal-semiconductor field effect transistor (MESFET).

The transformer 41 (XFMR) is disposed on the main surface 90a of the module substrate 90. The transformer 41 is disposed in adjacent to the power amplifier circuit 10 and is disposed relatively far away from the matching circuit 53. Specifically, the transformer 41 is disposed farther away from the matching circuit 53 and/or the matching circuit 54 than the transformer 42 is.

The matching circuits 51 to 54 (MN) are disposed on the main surface 90a of the module substrate 90. Inductors included in the individual matching circuits 51 to 54 are implemented as chip inductors. The chip inductors represent surface mount devices (SMDs) each configuring an inductor. Part of or all the inductors included in the matching circuits 51 to 54 may be included in an integrated passive device (IPD).

The matching circuit 52 and the transformer 42 overlap at least partially in plan view of the module substrate 90. That is, part of or the entire matching circuit 52 and part of or the entire transformer 42 overlap in plan view of the module substrate 90.

The filter circuits 61T, 62T, and 63T (Tx-FIL) are disposed on the main surface 90a of the module substrate 90. The filter circuits 61T, 62T, and 63T are disposed relatively close to the transformers 41 and 42.

The filter circuits 61R, 62R, and 63R (Rx-FIL) are disposed on the main surface 90a of the module substrate 90. The filter circuits 61R, 62R, and 63R are disposed relatively far away from the transformers 41 and 42.

The filter circuits 61T, 61R, 62T, 62R, 63T, and 63R may be surface acoustic wave (SAW) filters, bulk acoustic wave (BAW) filters, LC resonance filters, dielectric resonance filters, or a combination of desired filters mentioned above and are not limited to the filters mentioned above.

The metal member 91 (SCW) is disposed on the main surface 90a of the module substrate 90 and is disposed between the transformer 41 and the matching circuit 53 in plan view of the module substrate 90. The metal member 91 extends from the main surface 90a of the module substrate 90 to the shield layer 94. A tip of the metal member 91 is connected to the shield layer 94. In FIG. 4, the tip of the metal member 91 is directly connected to the shield layer 94. However, the tip of the metal member 91 may be connected to the shield layer 94 with another metal member interposed therebetween or is not necessarily connected to the shield layer 94. For example, copper, gold, or brass may be used as a material of the metal member 91. However, the material of the metal member 91 is not limited to the material mentioned above. The metal member 91 is not necessarily a metal wall and may include a plurality of metal members. For example, the metal member 91 may include a plurality of columnar members that are disposed separately from one another. Furthermore, the metal member 91 is not necessarily included in the radio frequency module 1.

Next, components disposed on the main surface 90b of the module substrate 90 will be described mainly with reference to FIGS. 3 and 4.

The low noise amplifier circuit 30 (LNA) is disposed on the main surface 90b of the module substrate 90. The low noise amplifier circuit 30 is implemented as a semiconductor integrated circuit. For example, silicon single crystal may be used as a semiconductor material. However, the semiconductor material is not limited to the material mentioned above.

The transformer 42 (XFMR) is disposed on the main surface 90b of the module substrate 90. The transformer 42 is disposed in adjacent to the power amplifier circuit 20 in plan view of the module substrate 90. In this embodiment, the transformer 42 and the transformer 41 do not overlap in plan view of the module substrate 90.

The switch circuits 71 and 72 (SW) are disposed on the main surface 90b of the module substrate 90. Each of the switch circuits 71 and 72 is implemented as a semiconductor integrated circuit. For example, silicon single crystal may be used as a semiconductor material. However, the semiconductor material is not limited to the material mentioned above. The switch circuits 71 and 72 may be implemented as a single semiconductor integrated circuit.

The PA control circuit 80 (PAC) is disposed on the main surface 90b of the module substrate 90. The PA control circuit 80 is implemented as a semiconductor integrated circuit. For example, silicon single crystal may be used as a semiconductor material. However, the semiconductor material is not limited to the material mentioned above.

The plurality of external connection terminals 100 are disposed on the main surface 90b of the module substrate 90. The plurality of external connection terminals 100 include the antenna connection terminal 101, the radio frequency input terminals 102 and 103, and the radio frequency output terminals 104 and 105, which are illustrated in FIG. 1. Furthermore, the plurality of external connection terminals 100 include a ground terminal disposed between the transformer 42 and the power amplifier circuit 10 in plan view of the module substrate 90 and a ground terminal disposed between the switch circuit 72 and the transformer 42 in plan view of the module substrate 90. Each of the plurality of external connection terminals 100 is electrically connected to an input/output terminal, a ground terminal, and/or the like on a mother substrate (not illustrated in the drawings)

disposed in the z-axis negative direction of the radio frequency module 1. Copper electrodes or solder electrodes may be used as the plurality of external connection terminals 100. However, the plurality of external connection terminals 100 are not limited to the electrodes mentioned above.

The resin member 92 covers at least part of the main surface 90a of the module substrate 90 and circuit components on the main surface 90a. The resin member 92 does not cover a tip of the metal member 91, and the tip of the metal member 91 is thus exposed from the resin member 92. For example, epoxy resin may be used as a material of the resin member 92. However, the material of the resin member 92 is not limited to the material mentioned above. The resin member 92 has a function for ensuring reliability of mechanical strength, moisture resistance, and the like of the circuit components on the main surface 90a. The resin member 92 is not necessarily included in the radio frequency module 1.

The resin member 93 covers at least part of the main surface 90b of the module substrate 90 and circuit components on the main surface 90b. The resin member 93 does not necessarily cover at least part of the low noise amplifier circuit 30, the switch circuits 71 and 72, and the PA control circuit 80. That is, at least part of the low noise amplifier circuit 30, the switch circuits 71 and 72, and the PA control circuit 80 may be exposed from the resin member 93. For example, epoxy resin may be used as a material of the resin member 93. However, the material of the resin member 93 is not limited to the material mentioned above. The resin member 93 has a function for ensuring reliability of mechanical strength, moisture resistance, and the like of the circuit components on the main surface 90b. The resin member 93 is not necessarily included in the radio frequency module 1.

The shield layer 94 is, for example, a metal thin film formed by sputtering. The shield layer 94 covers surfaces of the resin members 92 and 93, as illustrated in FIG. 4. Furthermore, the shield layer 94 also covers a tip of the metal member 91. The shield layer 94 is connected to the ground. With the shield layer 94, intrusion of external noise into the radio frequency module 1 and interference of noise generated at the radio frequency module 1 with another module or another device can be suppressed.

1.4 Implementation Example of Transformers 41 and 42

Figure 5:
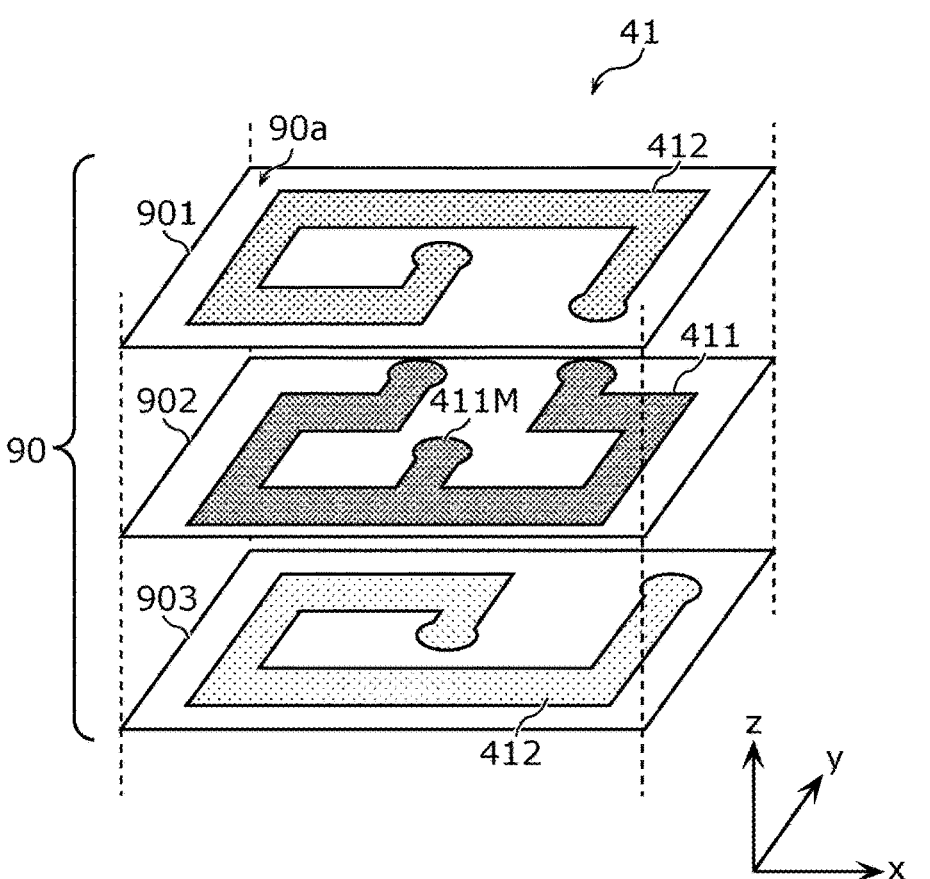
FIG. 5 is an exploded perspective view of a first transformer according to the first embodiment.
Figure 6:
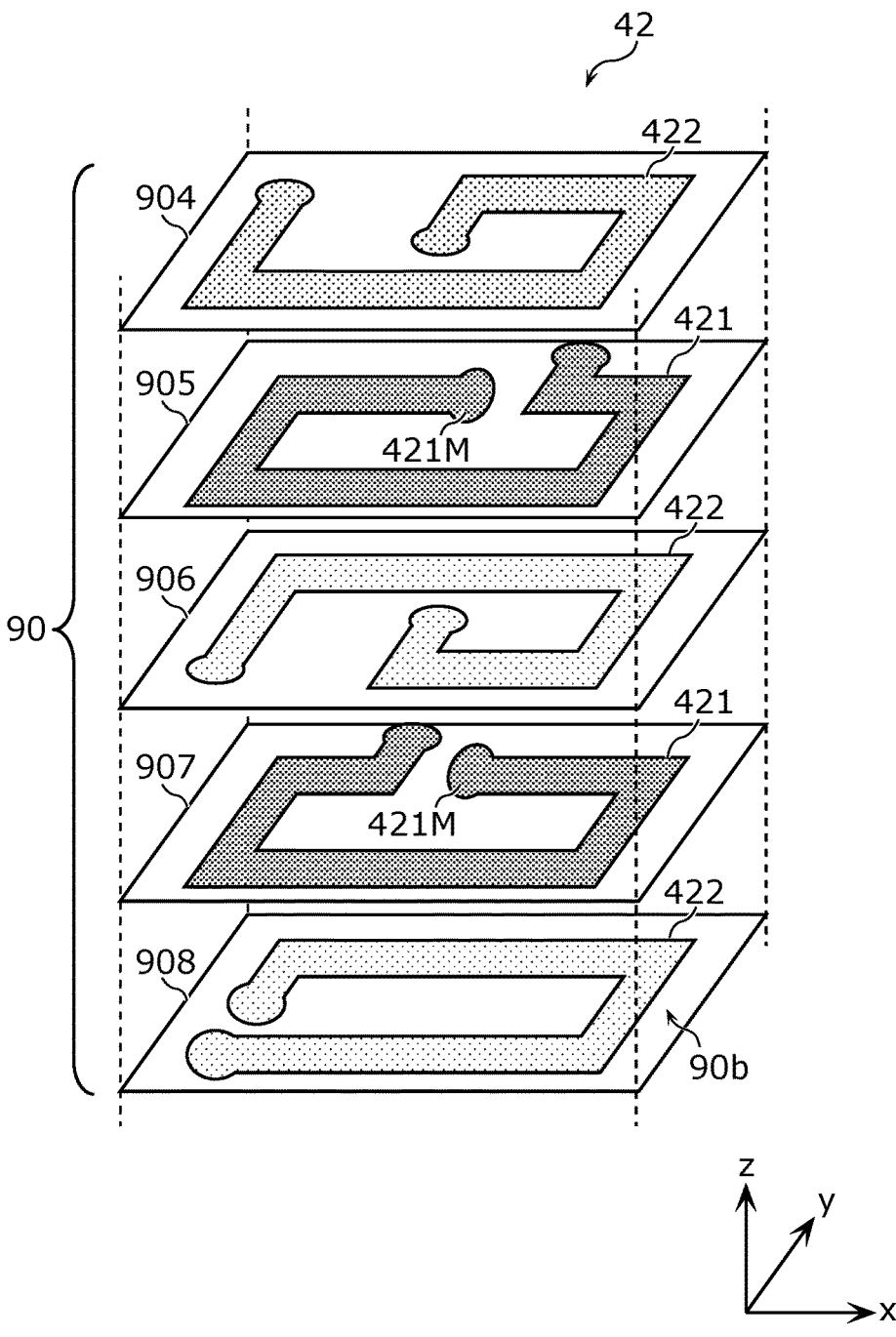
FIG. 6 is an exploded perspective view of a second transformer according to the first embodiment.

An implementation example of the transformers 41 and 42 will be described with reference to FIGS. 5 and 6. FIG. 5 is an exploded perspective view of the transformer 41 according to this embodiment. FIG. 6 is an exploded perspective view of the transformer 42 according to this embodiment.

FIGS. 5 and 6 illustrate illustrative configurations of the transformers 41 and 42, and the transformers 41 and 42 may be implemented by using any of a wide variety of circuit implementations and circuit techniques. Hence, description of the transformers 41 and 42 provided below should not be construed as being limiting in any way.

The transformer 41 is formed at a plurality of layers 901 to 903 (an example of a plurality of first layers) including the main surface 90a of the module substrate 90. The primary coil 411 of the transformer 41 is formed by a wire at the layer 902. The secondary coil 412 of the transformer 41 is formed by wires at the layers 901 and 903. The wires formed at the layers 901 and 903 are electrically connected with a via conductor (not illustrated in the drawing) interposed therebetween.

The transformer 42 is formed at a plurality of layers 904 to 908 (an example of a plurality of second layers) including the main surface 90*b* of the module substrate 90. The primary coil 421 of the transformer 42 is formed by wires at the layers 905 and 907. The wires formed at the layers 905 and 907 are electrically connected with a via conductor (not illustrated in the drawing) interposed therebetween. The secondary coil 422 of the transformer 42 is formed by wires at the layers 904, 906, and 908. The wires formed at the layers 904, 906, and 908 are electrically connected with a via conductor (not illustrated in the drawing) interposed therebetween.

In this embodiment, the plurality of layers 901 to 903 at which the transformer 41 is formed and the plurality of layers 904 to 908 at which the transformer 42 is formed do not overlap. That is, none of the plurality of layers 901 to 903 at which the transformer 41 is formed is included in any of the plurality of layers 904 to 908 at which the transformer 42 is formed. In other words, none of the plurality of layers 904 to 908 at which the transformer 42 is formed is included in any of the plurality of layers 901 to 903 at which the transformer 41 is formed.

The plurality of layers at which the transformer 41 is formed and the plurality of layers at which the transformer 42 is formed may overlap at least partially. That is, part of or the entire transformer 41 and the transformer 42 may share the same layer, and part of or the entire transformer 42 and the transformer 41 may share the same layer.

Although the transformers 41 and 42 are formed by wires of the module substrate 90 in this embodiment, the transformers 41 and 42 are not necessarily formed in the manner described above. For example, the transformer 41 and/or the transformer 42 may be implemented as an SMD.

1.5 Effects and Others

As described above, the radio frequency module 1 according to this embodiment includes the module substrate 90 having the main surfaces 90*a* and 90*b* that are opposite to each other, the plurality of external connection terminals 100 that are disposed on the main surface 90*b*, the power amplifier circuit 10 that is disposed on the main surface 90*a* and supports the first power class, the power amplifier circuit 20 that is disposed on the main surface 90*a* and supports the second power class, the transformer 41 that is connected to the power amplifier circuit 10 and disposed on the main surface 90*a*, and the transformer 42 that is connected to the power amplifier circuit 20 and disposed on the main surface 90*b*. The second power class is defined by a maximum output power higher than the power class 3, and the first power class is defined by a maximum output power lower than the second power class or the same maximum output power as the second power class.

Accordingly, since the transformers 41 and 42 are disposed on the main surfaces 90*a* and 90*b* of the module substrate 90, respectively, this arrangement contributes to reducing the size of the radio frequency module 1, compared to the case where both the transformers 41 and 42 are disposed on the main surface 90*a* of the module substrate 90. Furthermore, with a ground layer inside the module substrate 90, the ground terminal included in the plurality of external connection terminals 100, and/or the like, coupling between a component (for example, an inductor) disposed on the main surface 90*a* and the transformer 42 can be suppressed, and isolation between the transformer 42 and the component can be improved. In particular, since the transformer 42 for the second power class, which allows a maximum output power higher than the power class 3, provides a large amount of radiation, an isolation improvement effect achieved by arranging the transformer 42 on the main surface 90*b* is significant.

Furthermore, for example, the radio frequency module 1 according to this embodiment may further include the low noise amplifier circuit 30 and the matching circuit 53 and/or the matching circuit 54 that are/is connected to the low noise amplifier circuit 30 and disposed on the main surface 90*a*. The transformer 41 may be disposed farther away from an inductor(s) of the matching circuit 53 and/or the matching circuit 54 than the transformer 42 is.

Accordingly, the transformer 41 that is disposed on the main surface 90*a* on which the matching circuit 53 and/or the matching circuit 54 are/is disposed may be disposed relatively far away from the inductor(s) of the matching circuit 53 and/or the matching circuit 54, and coupling between the transformer 41 and the inductor(s) can be suppressed. In contrast, coupling between the transformer 42 that is disposed on the main surface 90*b* that is opposite the surface on which the matching circuit 53 and/or the matching circuit 54 are/is disposed and the inductor(s) of the matching circuit 53 and/or the matching circuit 54 can be suppressed by the ground layer or other elements inside the module substrate 90. Thus, a reduction in the reception sensitivity, which is caused by coupling between the inductor(s) of the matching circuit 53 and/or the matching circuit 54 and the transformers 41 and 42, can be suppressed.

Furthermore, for example, the radio frequency module 1 according to this embodiment may further include the metal member 91 that is disposed on the main surface 90*a* and disposed between the transformer 41 and the inductor(s) of the matching circuit 53 and/or the matching circuit 54 in plan view of the module substrate 90.

Accordingly, with the metal member 91, coupling between the transformer 41 and the inductor(s) of the matching circuit 53 and/or the matching circuit 54 can further be suppressed, and a reduction in the reception sensitivity can further be suppressed. Furthermore, a heat dissipation path for the transformer 42 disposed on the main surface 90*b* can be increased, and the heat dissipation characteristics of the transformer 42 can be improved.

Furthermore, for example, the radio frequency module 1 according to this embodiment may further include the resin member 92 that covers at least part of the power amplifier circuit 10 and the power amplifier circuit 20 that are disposed on the main surface 90*a* and the shield layer 94 that covers at least part of a surface of the resin member 92, and a tip of the metal member 91 may be connected to the shield layer 94.

Accordingly, since the tip of the metal member 91 is connected to the shield layer 94, the ground potential of the metal member 91 can be enhanced, and coupling between the transformer 41 and the inductor(s) of the matching circuit 53 and/or the matching circuit 54 can further be suppressed. Furthermore, heat of the transformer 42 disposed on the main surface 90*b* can be dissipated through the metal member 91 and the shield layer 94, and the heat dissipation characteristics of the transformer 42 can further be improved.

Furthermore, for example, the radio frequency module 1 according to this embodiment may further include the matching circuit 52 that is connected to the transformer 42 and disposed on the main surface 90*a*, and the matching circuit 52 and the transformer 42 may overlap at least partially in plan view of the module substrate 90.

Accordingly, a region of the main surface 90*a* that overlaps with the transformer 42 can be used effectively, and the effective use of the region contributes to reducing the size of the radio frequency module 1.

Furthermore, for example, in the radio frequency module 1 according to this embodiment, the transformer 41 may be formed at the plurality of layers 901 to 903 including the main surface 90a of the module substrate 90, the transformer 42 may be formed at the plurality of layers 904 to 908 including the main surface 90b of the module substrate 90, and the plurality of layers 901 to 903 and the plurality of layers 904 to 908 do not necessarily overlap.

Accordingly, since the transformers 41 and 42 are formed at different layers, isolation between the transformers 41 and 42 can be improved.

Furthermore, for example, in the radio frequency module 1 according to this embodiment, the transformer 42 and the transformer 41 do not necessarily overlap in plan view of the module substrate 90.

Accordingly, since the transformer 41 and the transformer 42 do not overlap in plan view of the module substrate 90, the isolation between the transformers 41 and 42 can be improved.

Second Embodiment

Next, a second embodiment will be described. This embodiment is mainly different from the first embodiment in that one of the two power amplifier circuits is a Doherty-type power amplifier circuit. Features of a radio frequency module according to this embodiment that are different from those of the first embodiment will be mainly described below with reference to drawings.

2.1 Circuit Configuration of Radio Frequency Module 1A

Figure 7:
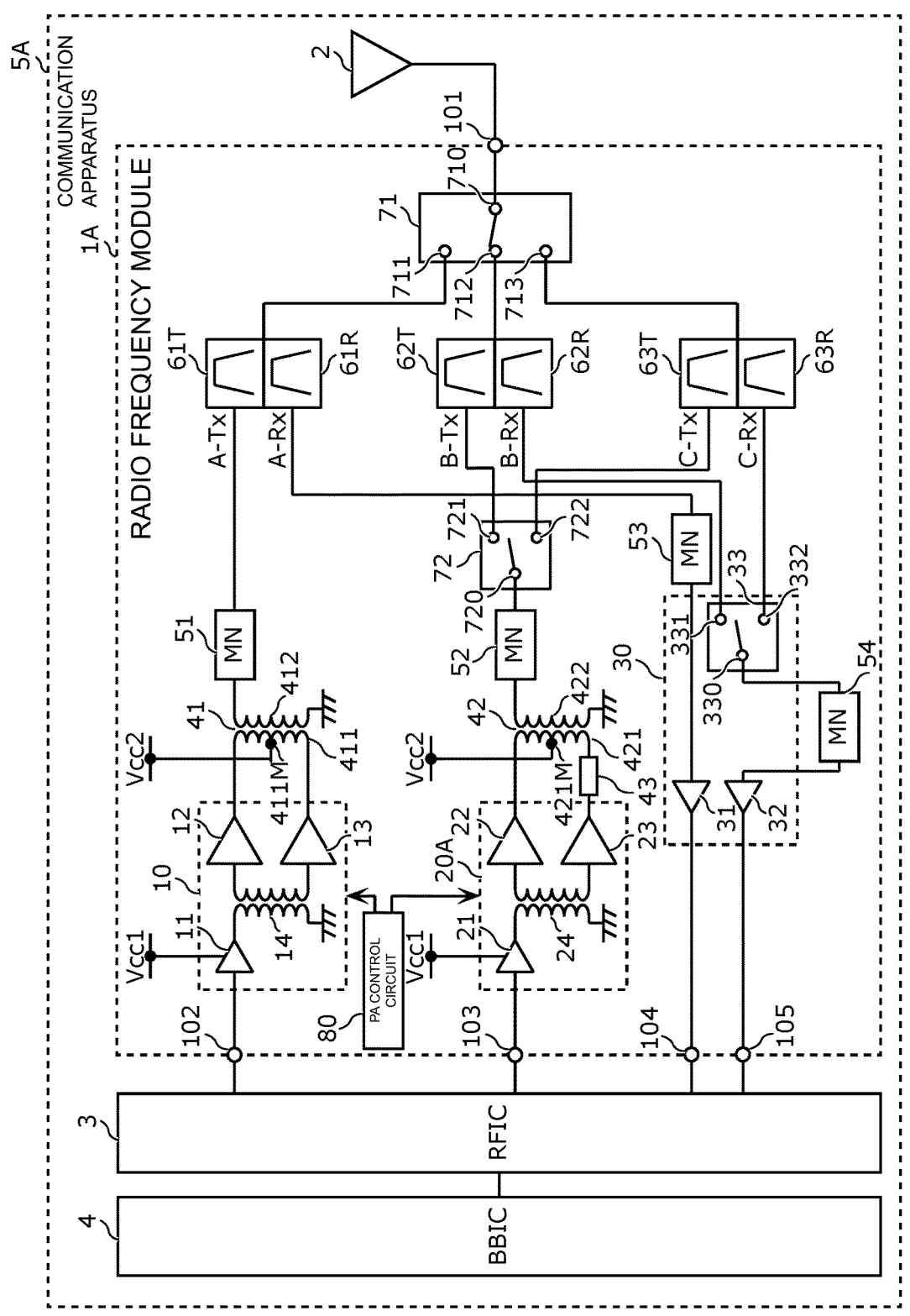
FIG. 7 is a circuit configuration diagram of a communication apparatus according to a second embodiment.

A circuit configuration of a radio frequency module 1A according to this embodiment will be described with reference to FIG. 7. FIG. 7 is a circuit configuration diagram of a communication apparatus 5A according to this embodiment.

FIG. 7 illustrates illustrative circuit configurations of the communication apparatus 5A and the radio frequency module 1A, and the communication apparatus 5A and the radio frequency module 1A may be implemented by using any of a wide variety of circuit implementations and circuit techniques. Hence, description of the communication apparatus 5A and the radio frequency module 1A provided below should not be construed as being limiting in any way.

Since the communication apparatus 5A is similar to the communication apparatus 5 according to the first embodiment with the exception that the communication apparatus 5A includes, instead of the radio frequency module 1, the radio frequency module 1A, description of the communication apparatus 5A will be omitted.

The radio frequency module 1A according to this embodiment includes, instead of the power amplifier circuit 20, a power amplifier circuit 20A, and further includes a ¼ wavelength transmission line 43. That is, the radio frequency module 1A includes the power amplifier circuits 10 and 20A, the low noise amplifier circuit 30, the transformers 41 and 42, the ¼ wavelength transmission line 43, the matching circuits 51 to 54, the filter circuits 61T, 61R, 62T, 62R, 63T, and 63R, the switch circuits 71 and 72, the PA control circuit 80, the antenna connection terminal 101, the radio frequency input terminals 102 and 103, and the radio frequency output terminals 104 and 105.

The power amplifier circuit 10 is an example of a first power amplifier circuit and is a differential-amplifier-type power amplifier circuit, as in the first embodiment. The power amplifier circuit 10 supports the first power class and is capable of obtaining output signals, as differential signals, with energies larger than those of input signals, by using the power supply voltages Vcc1 and Vcc2 supplied from power supplies (not illustrated in the drawing).

In this embodiment, the first power class is defined by the same maximum output power as the second power class. That is, the first power class and the second power class are the same. Typically, the power class 2 is used as the first power class.

The power amplifier circuit 20A is an example of a second power amplifier circuit and is a Doherty-type power amplifier circuit. The power amplifier circuit 20A supports the second power class and is capable of obtaining output signals with energies larger than those of input signals by using the power supply voltages Vcc1 and Vcc2 supplied from power supplies (not illustrated in the drawing).

In this embodiment, for example, the power class 1, 1.5, or 2 may be used as the second power class. Typically, the power class 2 is used as the second power class.

A Doherty-type power amplifier circuit represents an amplifier circuit that achieves high efficiency by using a plurality of amplifiers as a carrier amplifier and a peak amplifier. A carrier amplifier represents an amplifier that operates regardless of whether the power of an input signal (radio frequency signal) is low or high in a Doherty-type power amplifier circuit. A peak amplifier represents an amplifier that mainly operates in the case where the power of an input signal is high in a Doherty-type power amplifier circuit. In this embodiment, the power amplifier 22 functions as a carrier amplifier, and the power amplifier 23 functions as a peak amplifier. In this case, an input signal with low power is mainly amplified by the power amplifier 22, and an input signal with high power is amplified by the power amplifiers 22 and 23. With such an operation, in a Doherty-type power amplifier circuit, a load impedance viewed from the power amplifier 22 at low output power increases, and amplification efficiency at the low output power is improved.

The ¼ wavelength transmission line 43 is connected between the power amplifier circuit 20A and the transformer 42. Specifically, the ¼ wavelength transmission line 43 is connected between the output end of the power amplifier 23 and the primary coil 421 of the transformer 42. The ¼ wavelength transmission line 43 is capable of rotating the load impedance by 180 degrees on a Smith chart and may be called an impedance converter. Furthermore, the ¼ wavelength transmission line 43 is capable of adjusting the phase of a radio frequency signal and may be called a phase adjuster or a phase shifter. Specifically, the ¼ wavelength transmission line 43 is capable of shifting the phases of transmission signals of the bands B and C amplified by the power amplifier 23 by minus 90 degrees (delaying the phases by 90 degrees). The ¼ wavelength transmission line 43 may include an inductor and/or a capacitor. Thus, the length of the ¼ wavelength transmission line 43 can be shortened.

In this embodiment, a frequency band for FDD included in the high band group is used as the band A, and frequency bands for FDD included in the mid-band group are used as the bands B and C. However, the bands A to C are not limited to the frequency bands mentioned above. For example, a frequency band for TDD may be used as the band A. Furthermore, for example, a frequency band included in a band group different from the high band group may be used as the band A, and a frequency band(s) included in a band group(s) different from the mid-band group may be used as the band B and/or the band C.

The circuit configuration of the radio frequency module 1A is merely illustrative and is not limited to the circuit configuration in FIG. 7. For example, the radio frequency module 1A may further include one or more filter circuits. In this case, the one or more filter circuits and the filter circuit 61T may be connected to the matching circuit 51 with a switch circuit (not illustrated in the drawing) similar to the switch circuit 72 interposed therebetween.

2.2 Implementation Example of Radio Frequency Module 1A

Figure 8:
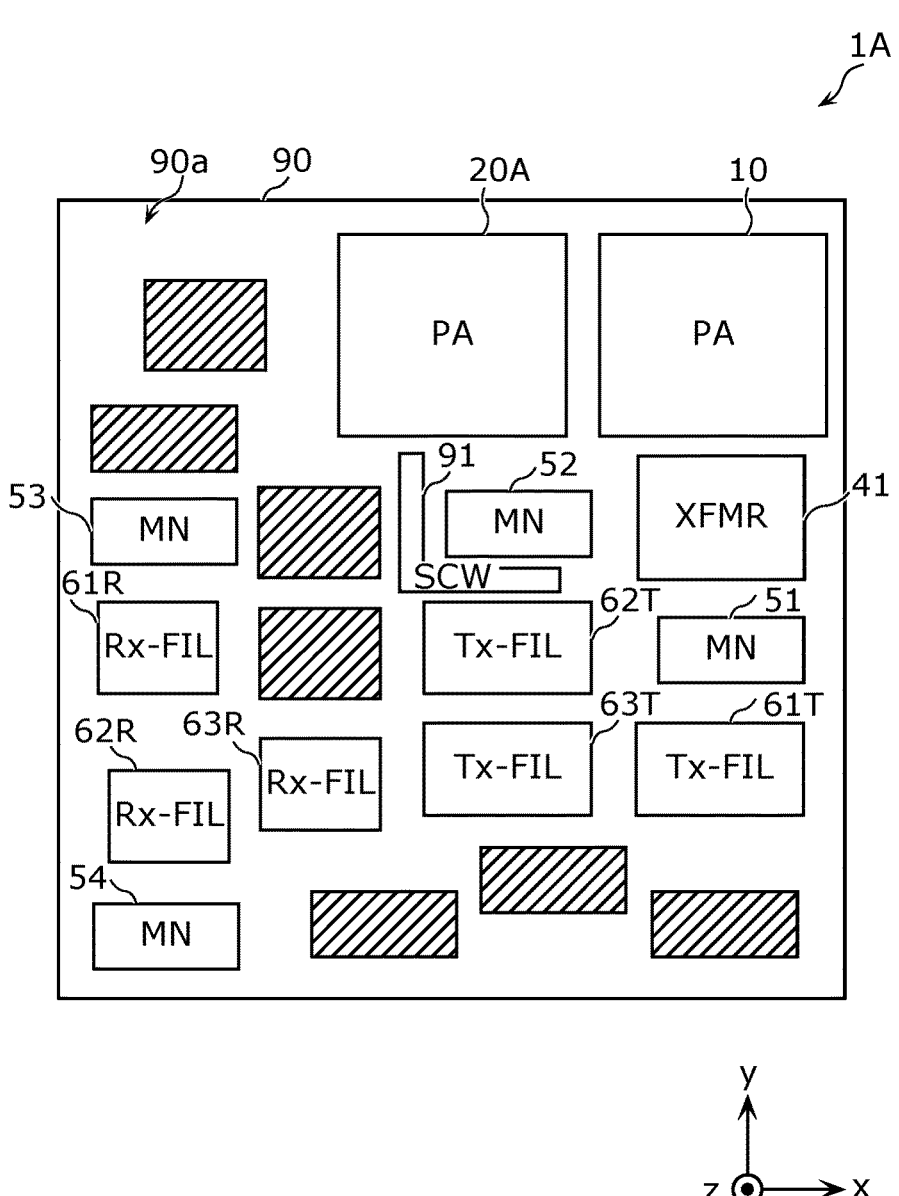
FIG. 8 is a plan view of the radio frequency module according to the second embodiment.
Figure 9:
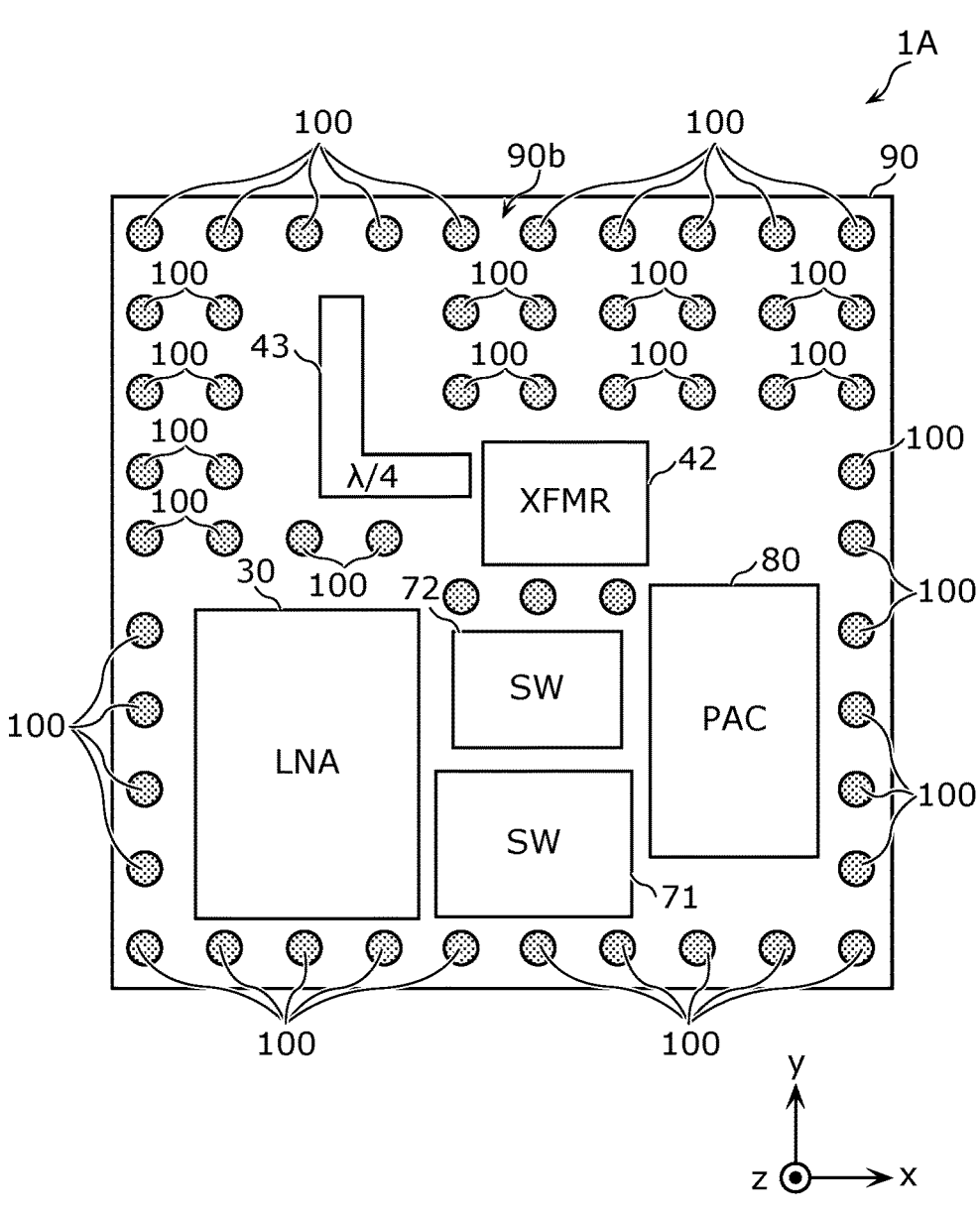
FIG. 9 is a plan view of the radio frequency module according to the second embodiment.

Next, an implementation example of the radio frequency module 1A having the circuit configuration described above will be described with reference to FIGS. 8 and 9. FIG. 8 is a plan view of the radio frequency module 1A according to this embodiment. FIG. 9 is a plan view of the radio frequency module 1A according to this embodiment and is a view assuming the main surface 90b side of the module substrate 90 is seen through from the z-axis positive side.

FIGS. 8 and 9 illustrate an illustrative configuration of the radio frequency module 1A, and the radio frequency module 1A may be implemented by using any of a wide variety of circuit implementations and circuit techniques. Hence, description of the radio frequency module 1A provided below should not be construed as being limiting in any way.

The power amplifier circuit 20A (PA) is disposed on the main surface 90a of the module substrate 90 and is implemented as a semiconductor integrated circuit, similarly to the power amplifier circuit 20 according to the first embodiment.

The ¼ wavelength transmission line 43 (λ/4) is disposed on the main surface 90b of the module substrate 90. The ¼ wavelength transmission line 43 is disposed in adjacent to the power amplifier circuit 20A in plan view of the module substrate 90.

2.3 Effects and Others

As described above, in the radio frequency module 1A according to this embodiment, the power amplifier circuit 10 may be a differential-amplifier-type power amplifier circuit, and the power amplifier circuit 20A may be a Doherty-type power amplifier circuit.

Accordingly, since the transformer 42 for the Doherty-type power amplifier circuit is disposed on the main surface 90b of the module substrate 90, the ¼ wavelength transmission line 43 necessary for the Doherty-type power amplifier circuit can be easily disposed on the main surface 90b of the module substrate 90. Thus, a region of the main surface 90b of the module substrate 90 can be used effectively, and the effective use of the region contributes to reducing the size of the radio frequency module 1A. In particular, a size reduction effect achieved by arranging the relatively large ¼ wavelength transmission line 43 on the main surface 90b is significant. Furthermore, by disposing the ¼ wavelength transmission line 43 and the transformer 42, which are connected to the power amplifier circuit 20A that is disposed on the main surface 90a and often operates in a region with a large distortion, on the main surface 90b, leakage of out-of-band noise to many components disposed on the main surface 90a can be suppressed.

Third Embodiment

Next, a third embodiment will be described. This embodiment is mainly different from the first embodiment in that the band A is a band for TDD. Features of a radio frequency module according to this embodiment that are different from those of the first embodiment will be mainly described below with reference to drawings.

3.1 Circuit Configuration of Radio Frequency Module 1B

Figure 10:
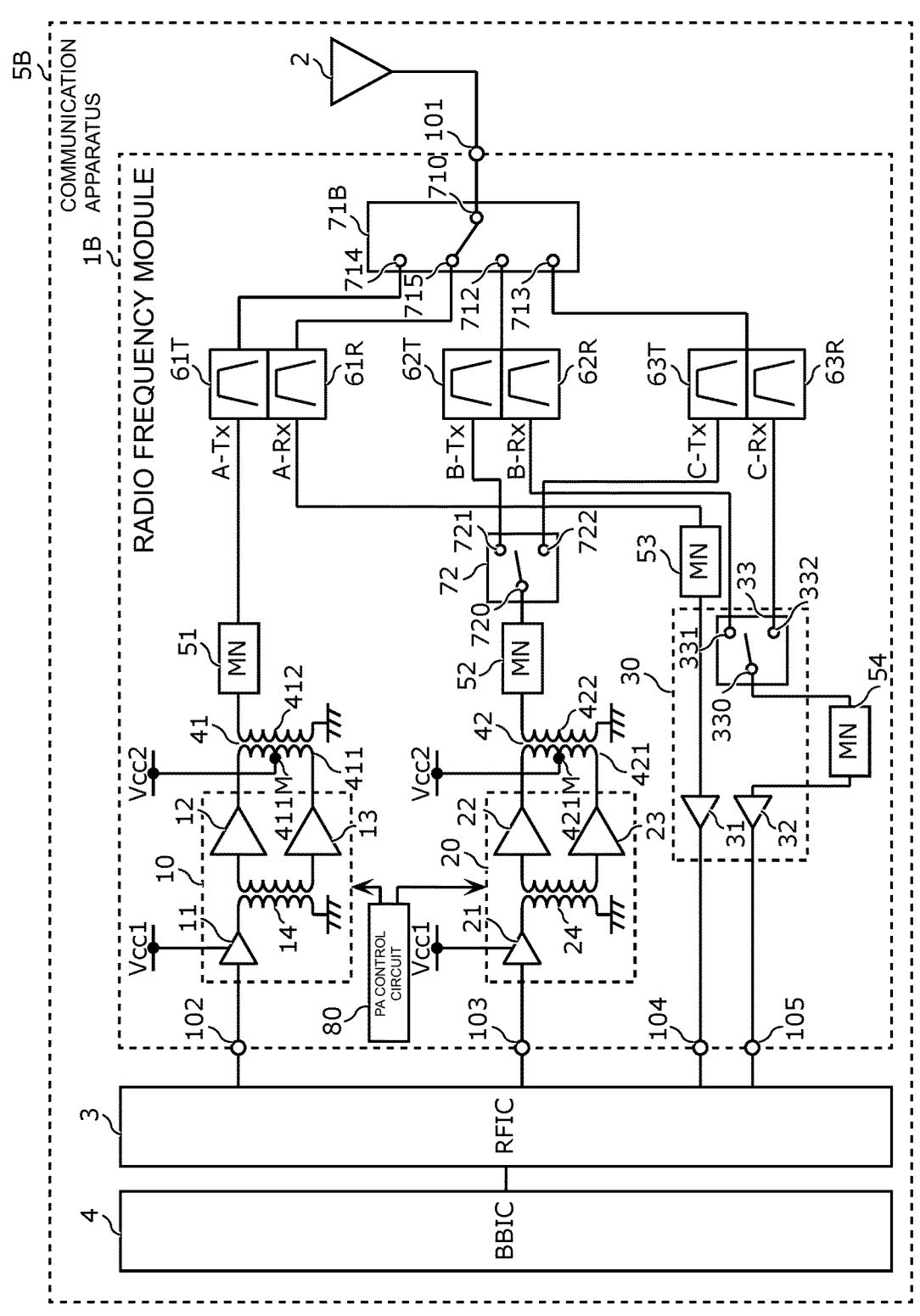
FIG. 10 is a circuit configuration diagram of a communication apparatus according to a third embodiment.

A circuit configuration of a radio frequency module 1B according to this embodiment will be described with reference to FIG. 10. FIG. 10 is a circuit configuration diagram of a communication apparatus 5B according to this embodiment.

FIG. 10 illustrates illustrative circuit configurations of the communication apparatus 5B and the radio frequency module 1B, and the communication apparatus 5B and the radio frequency module 1B may be implemented by using any of a wide variety of circuit implementations and circuit techniques. Hence, description of the communication apparatus 5B and the radio frequency module 1B provided below should not be construed as being limiting in any way.

Since the communication apparatus 5B is similar to the communication apparatus 5 according to the first embodiment with the exception that the communication apparatus 5B includes, instead of the radio frequency module 1, the radio frequency module 1B, description of the communication apparatus 5B will be omitted.

The radio frequency module 1B includes, instead of the switch circuit 71, a switch circuit 71B. That is, the radio frequency module 1B includes the power amplifier circuits 10 and 20, the low noise amplifier circuit 30, the transformers 41 and 42, the matching circuits 51 to 54, the filter circuits 61T, 61R, 62T, 62R, 63T, and 63R, the switch circuits 71B and 72, the PA control circuit 80, the antenna connection terminal 101, the radio frequency input terminals 102 and 103, and the radio frequency output terminals 104 and 105.

In this embodiment, the first power class is defined by the same maximum output power as the second power class. That is, the first power class and the second power class are the same. Typically, the power class 2 is used as the first power class.

Furthermore, in this embodiment, a frequency band for TDD included in the high band group is used as the band A, and frequency bands for FDD included in the mid-band group are used as the bands B and C. The bands A to C are not limited to the frequency bands mentioned above. For example, a frequency band included in a band group different from the high band group may be used as the band A, and a frequency band(s) included in a band group(s) different from the mid-band group may be used as the band B and/or the band C.

The switch circuit 71B includes, instead of the terminal 711 connected to the filter circuits 61T and 61R, a terminal 714 connected to the filter circuit 61T and a terminal 715 connected to the filter circuit 61R. With this connection arrangement, the switch circuit 71B is capable of connecting the terminal 710 to the terminals 712 to 715, for example, in accordance with control signals from the RFIC 3. In this case, the switch circuit 71B is capable of connecting the terminal 710 exclusively to the terminals 714 and 715. That is, the switch circuit 71B is capable of selectively connecting the filter circuits 61T and 61R to the antenna connection terminal 101. The switch circuit 71B is, for example, a switch circuit of the multi-connection type.

The circuit configuration of the radio frequency module 1B is merely illustrative and is not limited to the circuit configuration in FIG. 10. For example, the radio frequency module 1B may further include one or more filter circuits. In this case, the one or more filter circuits and the filter circuit 61T may be connected to the matching circuit 51 with a switch circuit (not illustrated in the drawing) similar to the switch circuit 72 interposed therebetween.

Furthermore, the radio frequency module 1B may include, instead of the filter circuit 61T for transmission and the filter circuit 61R for reception, a filter for both transmission and reception. In this case, the radio frequency module 1B may include a switch circuit of the SPDT type between the filter for both transmission and reception and the matching circuits 51 and 53.

Since the implementation example of the radio frequency module 1B is similar to the implementation example of the radio frequency module 1 according to the first embodiment with the exception that, instead of the switch circuit 71, the switch circuit 71B is disposed on the main surface 90a of the module substrate 90, illustration and description of the implementation example of the radio frequency module 1B will be omitted.

3.2 Effects and Others

As described above, the radio frequency module 1B according to this embodiment may further include the filter circuit 61T that is disposed on the main surface 90a and connected to the transformer 41 and the filter circuit 62T that is disposed on the main surface 90a and connected to the transformer 42, the pass band of the filter circuit 61T may include the transmission band of the band A for TDD, and the pass band of the filter circuit 62T may include the transmission band of the band B for FDD.

Accordingly, with the ground layer inside the module substrate 90, a ground terminal included in the plurality of external connection terminals 100, and/or the like, coupling between a component (for example, an inductor) disposed on the main surface 90a and the transformer 42 for FDD can be suppressed, and isolation between the transformer 42 and the component can be improved. In particular, since transmission and reception are performed at the same time in the case of FDD, an improvement effect for the isolation between the transformer 42 and a reception component is significant.

Furthermore, for example, the radio frequency module 1B according to this embodiment may further include the filter circuit 63T that is disposed on the main surface 90a and connected to the transformer 42 and the switch circuit 72 that is disposed on the main surface 90b and connected between the transformer 42 and the filter circuits 62T and 63T, and the plurality of external connection terminals 100 may include the ground terminal disposed between the transformer 42 and the switch circuit 72.

Accordingly, coupling between the transformer 42 and an output end (terminals 721 and 722) of the switch circuit 72 can be suppressed, and isolation between the transformer 42 and the output end of the switch circuit 72 can be improved.

Fourth Embodiment

Next, a fourth embodiment will be described. This embodiment is mainly different from the first embodiment in that the bands B and C are bands for TDD. Features of a radio frequency module according to this embodiment that are different from those of the first embodiment will be mainly described below with reference to a drawing.

4.1 Circuit Configuration of Radio Frequency Module 1C

Figure 11:
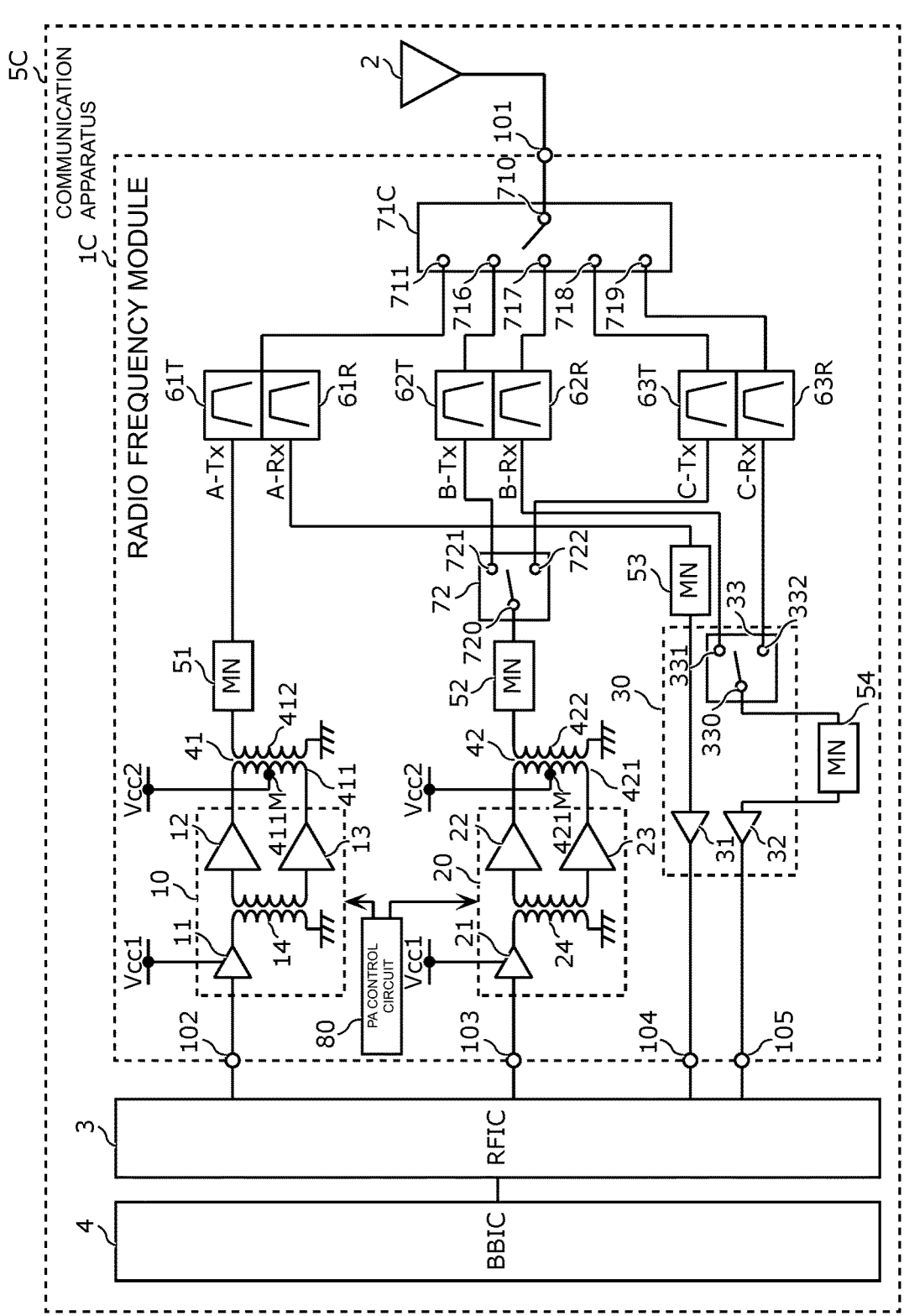
FIG. 11 is a circuit configuration diagram of a communication apparatus according to a fourth embodiment.

A circuit configuration of a radio frequency module 1C according to this embodiment will be described with reference to FIG. 11. FIG. 11 is a circuit configuration diagram of a communication apparatus 5C according to this embodiment.

FIG. 11 illustrates illustrative circuit configurations of the communication apparatus 5C and the radio frequency module 1C, and the communication apparatus 5C and the radio frequency module 1C may be implemented by using any of a wide variety of circuit implementations and circuit techniques. Hence, description of the communication apparatus

5C and the radio frequency module 1C provided below should not be construed as being limiting in any way.

Since the communication apparatus 5C is similar to the communication apparatus 5 according to the first embodiment with the exception that the communication apparatus 5C includes, instead of the radio frequency module 1, the radio frequency module 1C, description of the communication apparatus 5C will be omitted.

The radio frequency module 1C includes, instead of the switch circuit 71, a switch circuit 71C. That is, the radio frequency module 1C includes the power amplifier circuits 10 and 20, the low noise amplifier circuit 30, the transformers 41 and 42, the matching circuits 51 to 54, the filter circuits 61T, 61R, 62T, 62R, 63T, and 63R, the switch circuits 71C and 72, the PA control circuit 80, the antenna connection terminal 101, the radio frequency input terminals 102 and 103, and the radio frequency output terminals 104 and 105.

In this embodiment, the first power class is defined by the same maximum output power as the second power class. That is, the first power class and the second power class are the same. Typically, the power class 2 is used as the first power class.

Furthermore, in this embodiment, a frequency band for FDD included in the mid-band group is used as the band A, and frequency bands for TDD included in the high band group are used as the bands B and C. The bands A to C are not limited to the frequency bands mentioned above. For example, a frequency band included in a band group different from the mid-band group may be used as the band A, and a frequency band(s) included in a band group(s) different from the high band group may be used as the band B and/or the band C.

The switch circuit 71C includes, instead of the terminal 712 connected to the filter circuits 62T and 62R and the terminal 713 connected to the filter circuits 63T and 63R, a terminal 716 connected to the filter circuit 62T, a terminal 717 connected to the filter circuit 62R, a terminal 718 connected to the filter circuit 63T, and a terminal 719 connected to the filter circuit 63R. With this connection arrangement, the switch circuit 71C is capable of connecting the terminal 710 to the terminal 711 and 716 to 719, for example, in accordance with control signals from the RFIC 3. In this case, the switch circuit 71C is capable of connecting the terminal 710 exclusively to the terminals 716 and 717 and capable of connecting the terminal 710 exclusively to the terminals 718 and 719. That is, the switch circuit 71C is capable of selectively connecting the filter circuits 62T and 62R to the antenna connection terminal 101 and capable of selectively connecting the filter circuits 63T and 63R to the antenna connection terminal 101. The switch circuit 71C is, for example, a switch circuit of the multi-connection type.

The circuit configuration of the radio frequency module 1C is merely illustrative and is not limited to the circuit configuration in FIG. 11. For example, the radio frequency module 1C may further include one or more filter circuits. In this case, the one or more filter circuits and the filter circuit 61T may be connected to the matching circuit 51 with a switch circuit (not illustrated in the drawing) similar to the switch circuit 72 interposed therebetween.

The radio frequency module 1C may include, instead of the filter circuit 62T for transmission and the filter circuit 62R for reception, a filter for both transmission and reception. In this case, the radio frequency module 1C may include a switch circuit of the SPDT type between the filter for both transmission and reception, the terminal 721 of the switch circuit 72, and the terminal 331 of the switch 33.

Similarly, the radio frequency module 1C may include, instead of the filter circuit 63T for transmission and the filter circuit 63R for reception, a filter for both transmission and reception. In this case, the radio frequency module 1C may include a switch circuit of the SPDT type between the filter for both transmission and reception, the terminal 722 of the switch circuit 72, and the terminal 332 of the switch 33.

Since the implementation example of the radio frequency module 1C is similar to the implementation example of the radio frequency module 1 according to the first embodiment with the exception that, instead of the switch circuit 71, the switch circuit 71C is disposed on the main surface 90a of the module substrate 90, illustration and description of the implementation example of the radio frequency module 1C will be omitted.

4.2 Effects and Others

As described above, the radio frequency module 1C according to this embodiment may further include the filter circuit 61T that is disposed on the main surface 90a and connected to the transformer 41 and the filter circuit 62T that is disposed on the main surface 90a and connected to the transformer 42, the pass band of the filter circuit 61T may include the transmission band of the band A for FDD, and the pass band of the filter circuit 62T may include the transmission band of the band B for TDD.

Accordingly, since the transformer 42 for the band B for TDD is disposed on the main surface 90b of the module substrate 90, isolation between the transformer 42 and another component (for example, a component for reception of the band A for FDD) disposed on the main surface 90a can be improved.

Fifth Embodiment

Next, a fifth embodiment will be described. This embodiment is mainly different from the first embodiment in that the third power class that is defined by a maximum output power higher than the second power class can be supported by using two power amplifier circuits. Features of a radio frequency module according to this embodiment that are different from those of the first embodiment will be mainly described below with reference to drawings.

5.1 Circuit Configuration of Communication Apparatus 5D

Figure 12:
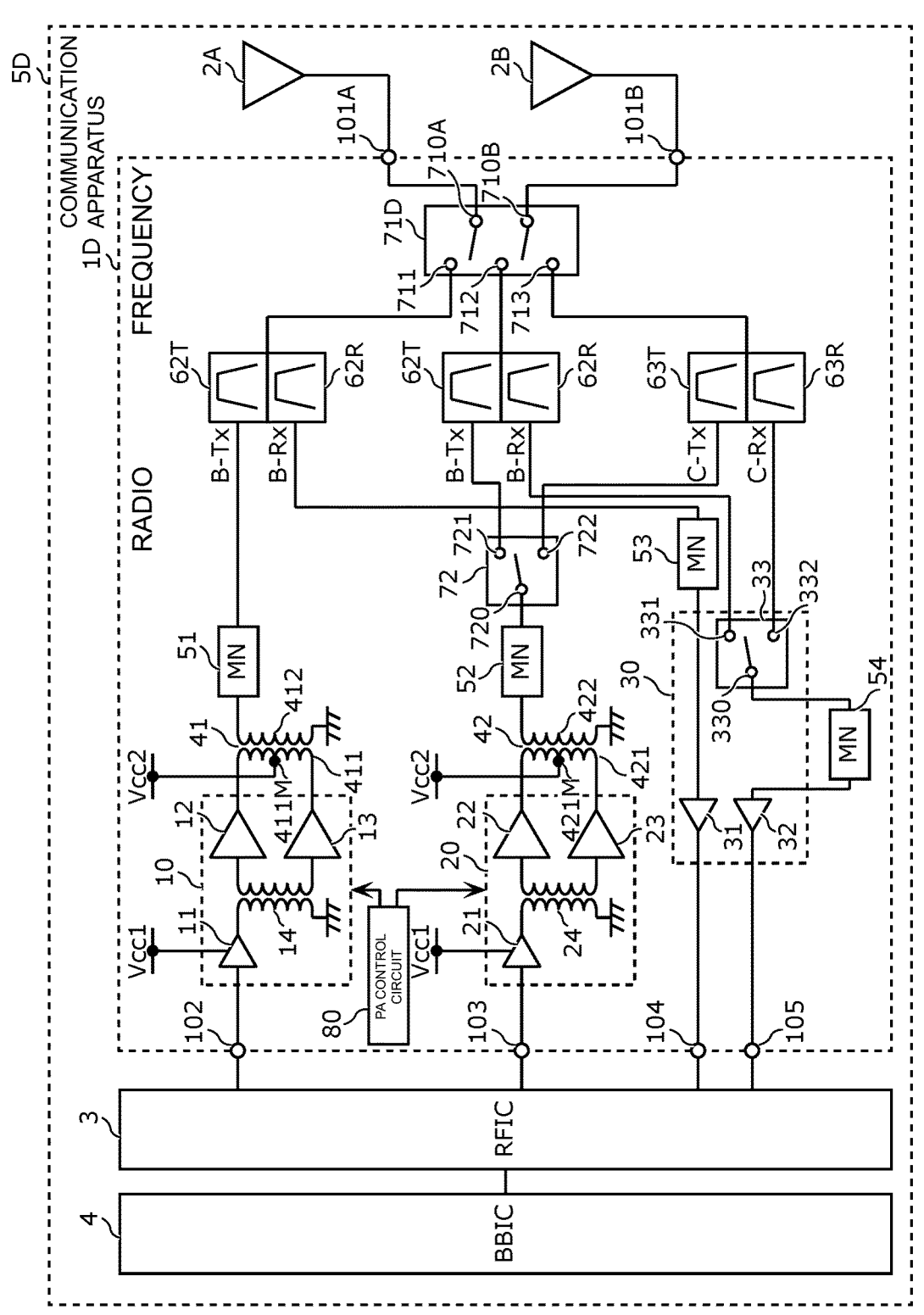
FIG. 12 is a circuit configuration diagram of a communication apparatus according to a fifth embodiment.

First, a circuit configuration of a communication apparatus 5D according to this embodiment will be described with reference to FIG. 12. FIG. 12 is a circuit configuration diagram of the communication apparatus 5D according to this embodiment.

FIG. 12 illustrates illustrative circuit configurations of the communication apparatus 5D and a radio frequency module 1D, and the communication apparatus 5D and the radio frequency module 1D may be implemented by using any of a wide variety of circuit implementations and circuit techniques. Hence, description of the communication apparatus 5D and the radio frequency module 1D provided below should not be construed as being limiting in any way.

The communication apparatus 5D includes, instead of the radio frequency module 1, the radio frequency module 1D and, instead of the antenna 2, antennas 2A and 2B. That is, the communication apparatus 5D includes the radio frequency module 1D, the antennas 2A and 2B, the RFIC 3, and the BBIC 4.

The antennas 2A and 2B are connected to antenna connection terminals 101A and 101B, respectively, of the radio frequency module 1D. Each of the antennas 2A and 2B is capable of transmitting a radio frequency signal output from the radio frequency module 1D and capable of receiving a radio frequency signal from the outside and then outputting the radio frequency signal to the radio frequency module 1D. In this embodiment, radio frequency signals of the same band are transmitted at the maximum output power of the second power class from the antennas 2A and 2B. Thus, the maximum output power of the third power class can be supported.

5.2 Circuit Configuration of Radio Frequency Module 1D

Next, a circuit configuration of the radio frequency module 1D according to this embodiment will be described with reference to FIG. 12. The radio frequency module 1D according to this embodiment includes, instead of the filter circuits 61T and 61R, filter circuits 62T and 62R, includes, instead of the switch circuit 71, a switch circuit 71D, and includes, instead of the antenna connection terminal 101, the antenna connection terminals 101A and 101B. That is, the radio frequency module 1D includes the power amplifier circuits 10 and 20, the low noise amplifier circuit 30, the transformers 41 and 42, the matching circuits 51 to 54, the two filter circuits 62T, the two filter circuits 62R, the filter circuits 63T and 63R, the switch circuits 71D and 72, the PA control circuit 80, the antenna connection terminals 101A and 101B, the radio frequency input terminals 102 and 103, and the radio frequency output terminals 104 and 105.

The two filter circuits 62T are examples of a first filter circuit and a second filter circuit. Each of the two filter circuits 62T is a band pass filter having a pass band including a transmission band of the band B (B-Tx). One end of one of the two filter circuits 62T is connected to the transformer 41 with the matching circuit 51 interposed therebetween, and the other end of the one of the filter circuits 62T is connected to the antenna connection terminal 101A or 101B with the switch circuit 71D interposed therebetween. One end of the other one of the two filter circuits 62T is connected to the transformer 42 with the switch circuit 72 and the matching circuit 52 interposed therebetween, and the other end of the other one of the two filter circuits 62T is connected to the antenna connection terminal 101A or 101B with the switch circuit 71D interposed therebetween.

Each of the two filter circuits 62R is a band pass filter having a pass band including a reception band of the band B (B-Rx). One end of one of the two filter circuits 62R is connected to the low noise amplifier 31 with the matching circuit 53 interposed therebetween, and the other end of the one of the two filter circuits 62R is connected to the antenna connection terminal 101A or 101B with the switch circuit 71D interposed therebetween. One end of the other one of the two filter circuits 62R is connected to the low noise amplifier 32 with the switch 33 and the matching circuit 54 interposed therebetween, and the other end of the other one of the two filter circuits 62R is connected to the antenna connection terminal 101A or 101B with the switch circuit 71D interposed therebetween.

In this embodiment, the band B is an example of the first band and is a frequency band capable of using the third power class that is defined by a maximum output power higher than the second power class. In this embodiment, a frequency band for FDD is used as the band B. However, a frequency band for TDD may be used as the band B.

The power amplifier circuit 10 is an example of a first power amplifier circuit and is a differential-amplifier-type power amplifier circuit. The power amplifier circuit 10 supports the first power class and is capable of obtaining output signals, as differential signals, with energies larger than those of input signals, by using the power supply voltages Vcc1 and Vcc2 supplied from power supplies (not illustrated in the drawing).

In this embodiment, the first power class is defined by the same maximum output power as the second power class. That is, the first power class and the second power class are the same power class. For example, the power class 1, 1.5, or 2 may be used as the first power class. Typically, the power class 2 is used as the first power class.

The power amplifier circuit 20 is an example of a second power amplifier circuit and is a differential-amplifier-type power amplifier circuit. The power amplifier circuit 20 supports the second power class and is capable of obtaining output signals with energies larger than those of input signals by using the power supply voltages Vcc1 and Vcc2 supplied from power supplies (not illustrated in the drawing).

In this embodiment, for example, the power class 1, 1.5, or 2 may be used as the second power class. Typically, the power class 2 is used as the second power class. For example, assuming the power class 2 is used as the first power class and the second power class, the third power class is the power class 1.5.

In the case where the third power class is applied to the band B, transmission signals of the band B are amplified at the same time by the power amplifier circuits 10 and 20. In contrast, in the case where the second power class is applied to the band B, a transmission signal of the band B is amplified by the power amplifier circuit 20 but is not amplified by the power amplifier circuit 10. That is, in the case of the band B, the power amplifier circuit 20 is used as a main power amplifier circuit and the power amplifier circuit 10 is used as an auxiliary power amplifier circuit.

The switch circuit 71D includes, instead of the terminal 710, a terminal 710A connected to the antenna connection terminal 101A and a terminal 710B connected to the antenna connection terminal 101B. With this connection arrangement, the switch circuit 71D is capable of connecting the terminals 710A and 710B to the terminals 711 to 713, for example, in accordance with control signals from the RFIC 3. For example, in the case where the third power class is applied to the band B, the switch circuit 71D connects the terminal 710A to the terminal 711 and connects the terminal 710B to the terminal 712. Thus, radio frequency signals of the band B amplified by the power amplifier circuits 10 and 20 are transmitted at the same time from the antennas 2A and 2B. In contrast, in the case where the third power class is applied to the band B, the switch circuit 71D does not connect the terminal 710A to the terminal 711 but connects the terminal 710B to the terminal 712. Thus, a radio frequency signal of the band B amplified by the power amplifier circuit 20 is transmitted from the antenna 2B. The switch circuit 71D is, for example, a switch circuit of the multi-connection type.

The circuit configuration of the radio frequency module 1D is merely illustrative and is not limited to the circuit configuration in FIG. 12. For example, the radio frequency module 1D may further include one or more filter circuits. In this case, the one or more filter circuits and one of the two filter circuits 62T may be connected to the matching circuit 51 with a switch circuit (not illustrated in the drawing) similar to the switch circuit 72 interposed therebetween.

5.3 Implementation Example of Radio Frequency Module 1D

Figure 13:
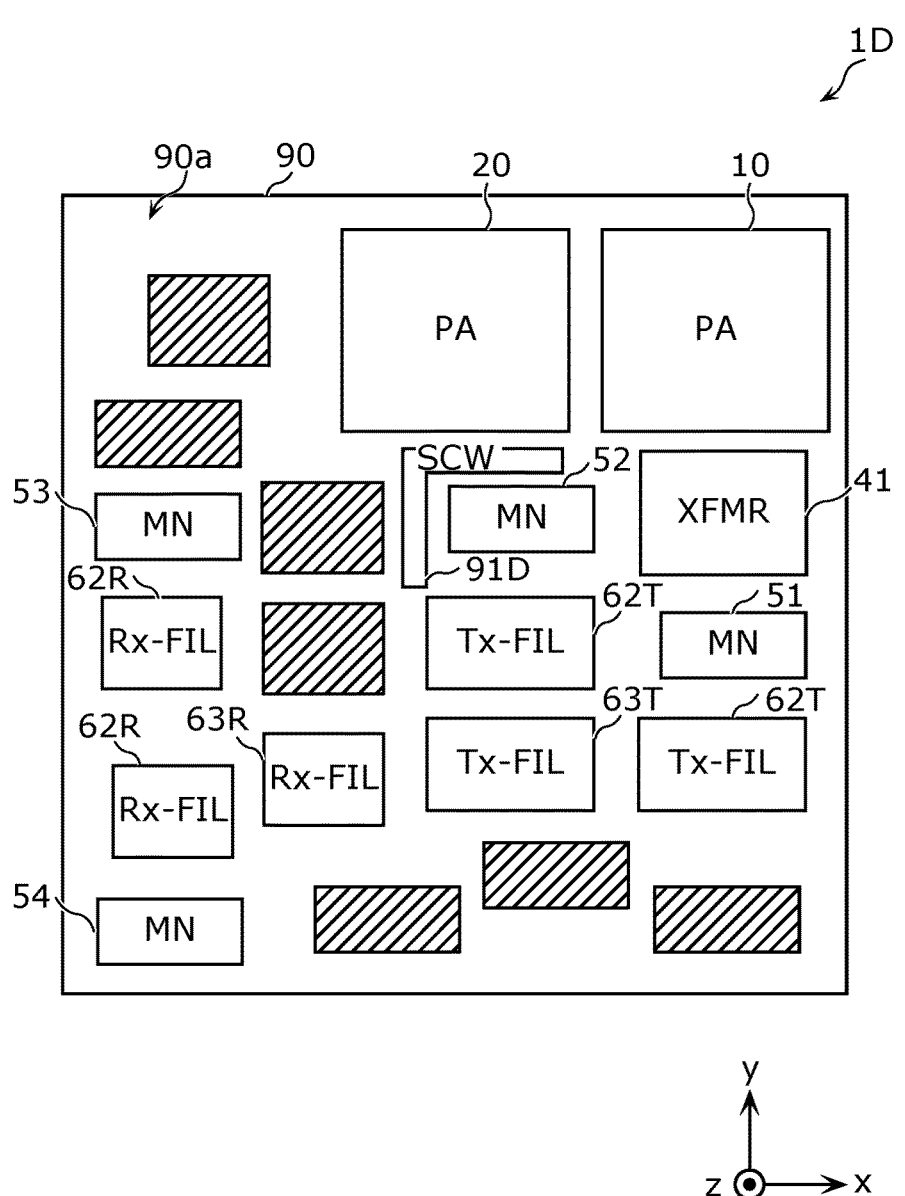
FIG. 13 is a plan view of a radio frequency module according to the fifth embodiment.
Figure 14:
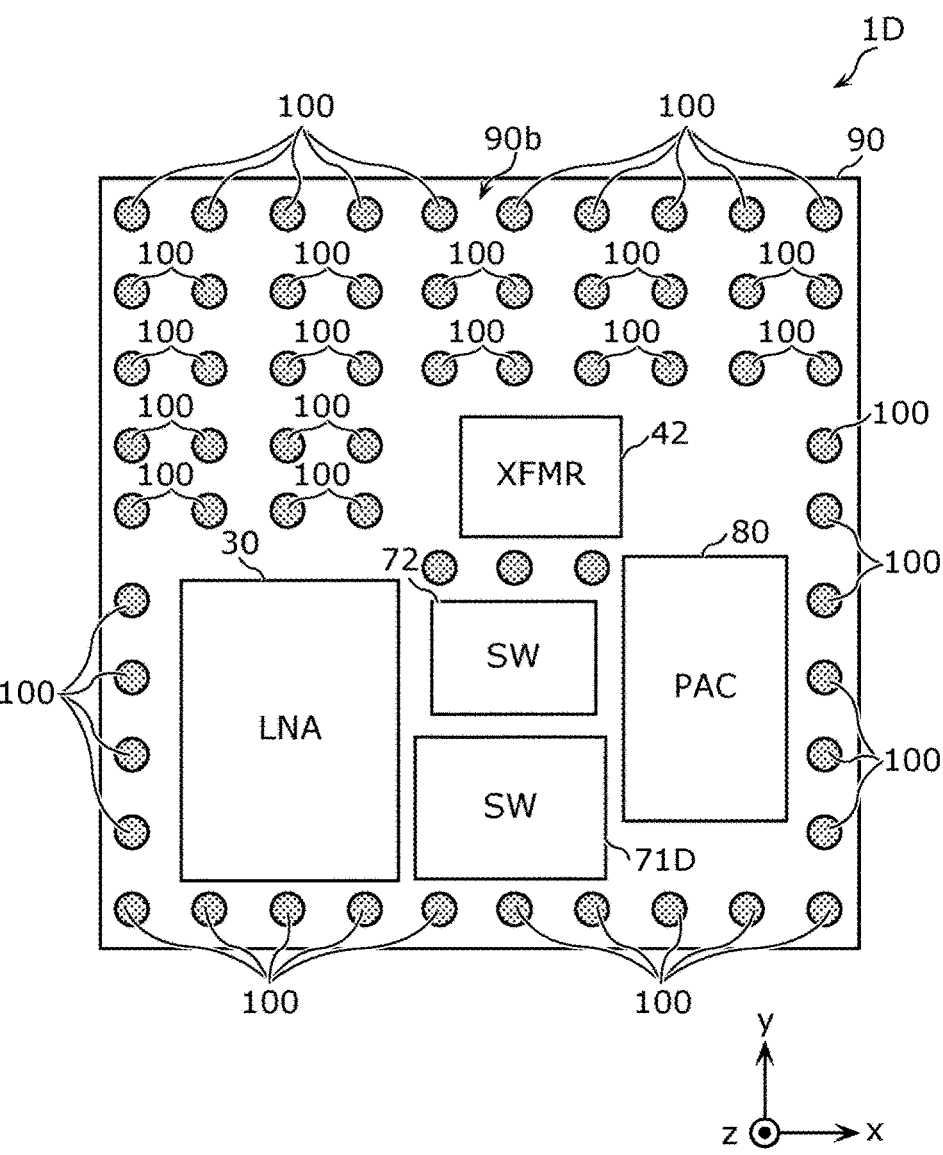
FIG. 14 is a plan view of the radio frequency module according to the fifth embodiment.

Next, an implementation example of the radio frequency module 1D having the circuit configuration described above will be described with reference to FIGS. 13 and 14. FIG. 13 is a plan view of the radio frequency module 1D according to this embodiment. FIG. 14 is a plan view of the radio frequency module 1D according to this embodiment and is a view assuming the main surface 90b of the module substrate 90 is seen through from the z-axis positive side.

FIGS. 13 and 14 illustrate an illustrative configuration of the radio frequency module 1D, and the radio frequency module 1D may be implemented by using any of a wide variety of circuit implementations and circuit techniques. Hence, description of the radio frequency module 1D provided below should not be construed as being limiting in any way.

In this embodiment, the radio frequency module 1D includes, instead of the metal member 91, a metal member 91D.

Similarly to the metal member 91, the metal member 91D (SCW) is disposed on the main surface 90a of the module substrate 90 and is disposed between the transformer 41 and the matching circuit 53 in plan view of the module substrate 90. The metal member 91D extends from the main surface 90a of the module substrate 90 to the shield layer 94. A tip of the metal member 91D is connected to the shield layer 94. For example, copper, gold, or brass may be used as a material of the metal member 91D. However, the material of the metal member 91D is not limited to the material mentioned above.

In this embodiment, the metal member 91D is disposed between the power amplifier circuit 20 and the transformer 41 in plan view of the module substrate 90. Furthermore, the metal member 91D is disposed between the power amplifier circuit 10 and the transformer 42 in plan view of the module substrate 90.

Instead of the switch circuit 71, the switch circuit 71D (SW) is disposed on the main surface 90b of the module substrate 90.

As in each of the embodiments described above, the plurality of external connection terminals 100 are disposed on the main surface 90b of the module substrate 90 and include a ground terminal disposed between the transformer 42 and the power amplifier circuit 10 in plan view of the module substrate 90.

5.4 Effects and Others

As described above, the radio frequency module 1D according to this embodiment may further include the filter circuit 62T that is disposed on the main surface 90a and connected to the transformer 41 and the filter circuit 62T that is disposed on the main surface 90a and connected to the transformer 42, each of the pass bands of the filter circuits 62T may include a transmission band of the band A, radio frequency signals of the band A may be amplified at the same time by the power amplifier circuits 10 and 20 in a case where the third power class that is defined by a maximum output power higher than the second power class is applied to the band A, a radio frequency signal of the band A may be amplified by the power amplifier circuit 20 and a radio frequency signal of the band A is not necessarily amplified by the power amplifier circuit 10 in a case where the second power class is applied to the band A.

Accordingly, the transformer 42 that is connected to the power amplifier circuit 20, which is used for both the third power class and the second power class, is disposed on the main surface 90b, and the transformer 41 that is connected to the power amplifier circuit 10, which is not used for the second power class, is disposed on the main surface 90a. Thus, with the ground layer inside the module substrate 90, the ground terminal included in the plurality of external connection terminals 100, and/or the like, coupling between a component (for example, an inductor) disposed on the main surface 90*a* and the transformer 42 connected to the power amplifier circuit 20, which is used for both the third power class and the second power class, can be suppressed, isolation between the transformer 42 and the component can be improved. Since the power amplifier circuit 20 is used more frequently than the power amplifier circuit 10, an improvement effect for the isolation between the transformer 42 and the component on the main surface 90*a* is significant.

Furthermore, for example, the radio frequency module 1D according to this embodiment may further include the metal member 91D that is disposed on the main surface 90*a* and disposed between the transformer 41 and the power amplifier circuit 20 in plan view of the module substrate 90.

Accordingly, with the metal member 91D, coupling between the transformer 41 and the input end of the power amplifier circuit 20 can be suppressed, and isolation between the transformer 41 and the input end of the power amplifier circuit 20 can be improved.

Furthermore, in the radio frequency module 1D according to this embodiment, the plurality of external connection terminals 100 may include a ground terminal disposed between the transformer 42 and the power amplifier circuit 10 in plan view of the module substrate 90.

Accordingly, coupling between the transformer 42 and the power amplifier circuit 10 can be suppressed, and isolation between the transformer 42 and the power amplifier circuit 10 can be improved.

Modification

Next, a modification that can be applied to each of the embodiments described above will be described. This modification is different from each of the embodiments described above in arrangement of two transformers. This modification will be described below with reference to FIGS. 15 to 17.

Figure 15:
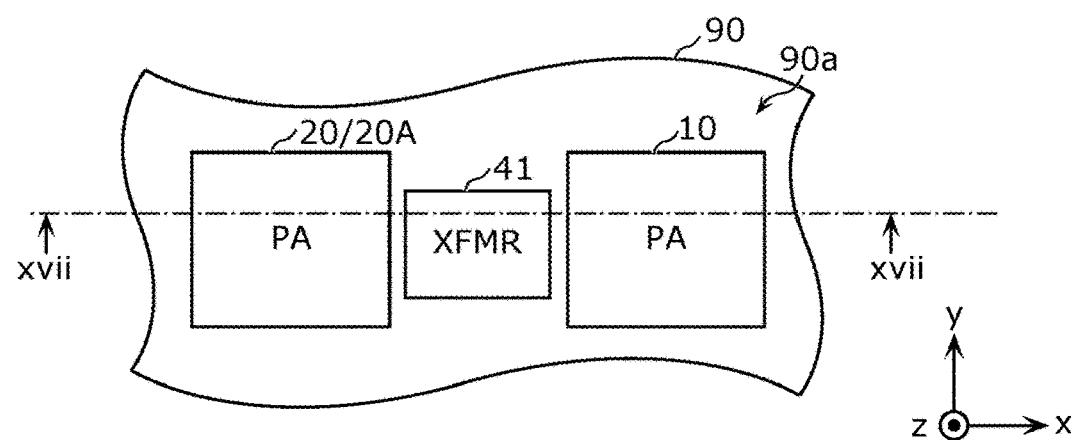
FIG. 15 is a partial plan view of a radio frequency module according to a modification.
Figure 16:
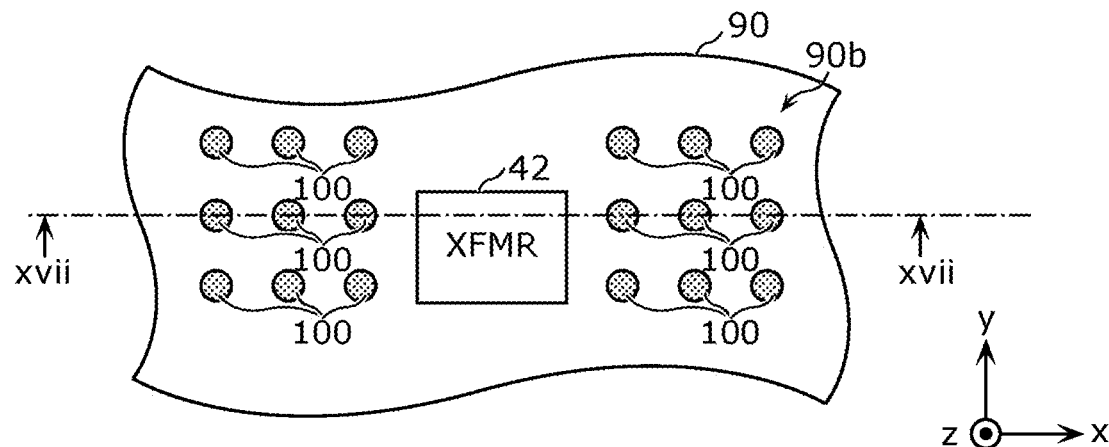
FIG. 16 is a partial plan view of the radio frequency module according to the modification.
Figure 17:
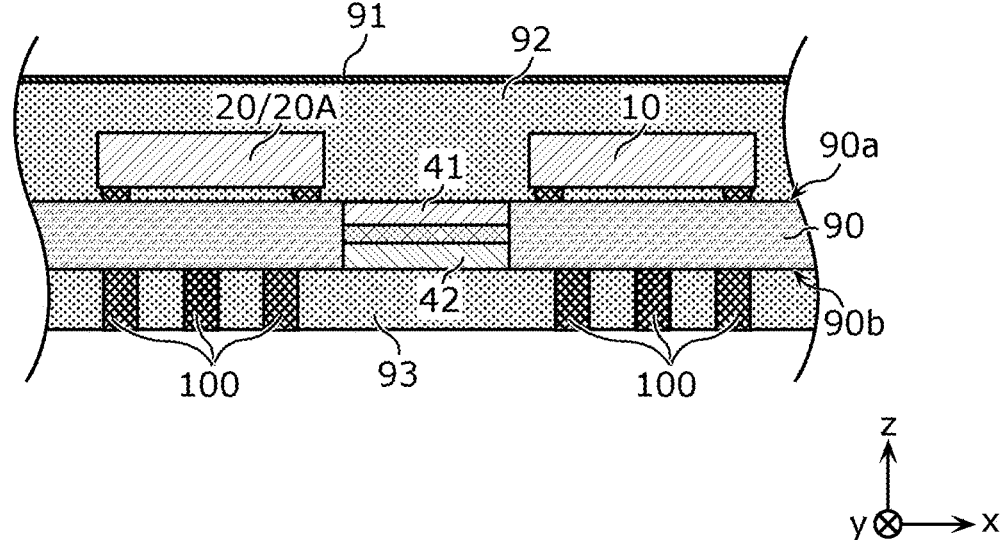
FIG. 17 is a partial cross-section view of the radio frequency module according to the modification.

FIG. 15 is a partial plan view of a radio frequency module according to this modification. FIG. 16 is a partial plan view of the radio frequency module according to this modification and is a view assuming the main surface 90*b* side of the module substrate 90 is seen through from the z-axis positive side. FIG. 17 is a partial cross-section view of the radio frequency module according to this modification. The cross section of the radio frequency module in FIG. 17 is a cross section along line xvii-xvii in FIGS. 15 and 16.

FIGS. 15 to 17 illustrate an illustrative configuration of the radio frequency module according to this modification, and the radio frequency module may be implemented by using any of a wide variety of circuit implementations and circuit techniques. Hence, description of the radio frequency module provided below should not be construed as being limiting in any way.

In this modification, the transformers 41 and 42 are disposed between the power amplifier circuits 10 and 20 (20A) in plan view of the module substrate 90. Furthermore, the transformer 42 and the transformer 41 overlap at least partially in plan view of the module substrate 90. Furthermore, the plurality of first layers including the main surface 90*a* of the module substrate 90 at which the transformer 41 is formed and the plurality of second layers including the main surface 90*b* of the module substrate 90 at which the transformer 42 is formed overlap at least partially. That is, at least part of the plurality of first layers at which the transformer 41 is formed is included in the plurality of second layers at which the transformer 42 is formed. In other words, at least part of the plurality of second layers at which the transformer 42 is formed is included in the plurality of first layers at which the transformer 41 is formed.

As described above, in the radio frequency module according to this modification, the transformer 41 may be formed at the plurality of first layers including the main surface 90*a* of the module substrate 90, the transformer 42 may be formed at the plurality of second layers including the main surface 90*b* of the module substrate 90, and the plurality of first layers and the plurality of second layers may overlap at least partially.

Accordingly, the number of layers of the module substrate 90 can be reduced, and the reduction in the number of layers of the module substrate 90 contributes to reducing production cost and reducing the height of the radio frequency module 1.

Furthermore, for example, in the radio frequency module according to this modification, the transformer 42 and the transformer 41 may overlap at least partially in plan view of the module substrate 90.

Accordingly, the size of a region occupied by the transformers 41 and 42 in plan view of the module substrate 90 can be reduced, and the reduction in the size of the region occupied by the transformers 41 and 42 contributes to reducing the size of the radio frequency module.

Furthermore, for example, in the radio frequency module according to this modification, the transformer 41 and the transformer 42 may be disposed between the power amplifier circuits 10 and 20 (20A) in plan view of the module substrate 90.

Accordingly, the length of a wire between the transformer 41 and the power amplifier circuit 10 and the length of a wire between the transformer 42 and the power amplifier circuit 20 (20A) can be reduced, and resistance loss caused by the wires and/or mismatching loss caused by stray capacitance of the wires can be suppressed.

Other Embodiments

A radio frequency module according to the present disclosure has been described above based on embodiments. However, the radio frequency module according to the present disclosure is not limited to the embodiments described above. Other embodiments implemented by combining component elements in the embodiments described above, modifications obtained by making various changes conceivable by those skilled in the art to the embodiments described above without departing from the gist of the present disclosure, and various types of equipment including a radio frequency module described above are also included in the present disclosure.

For example, in the circuit configuration of a radio frequency module according to each of the embodiments described above, a circuit element, a wire, and the like may be inserted between circuit elements and paths connecting signal paths disclosed in drawings. For example, an impedance matching circuit may be inserted between a filter and an antenna connection terminal.

In the first, third, fourth, and fifth embodiments described above, two power amplifier circuits included in a radio frequency module are differential-amplifier-type power amplifier circuits. However, the two power amplifier circuits are not necessarily differential-amplifier-type power amplifier circuits. For example, the two power amplifier circuits may be Doherty-type power amplifier circuits. Furthermore, for example, one of the two power amplifier circuits may be a differential-amplifier-type power amplifier circuit, and the other one of the two power amplifier circuits may be a Doherty-type power amplifier circuit.

Features of the radio frequency modules described above based on the embodiments will be described below.

<1>

A radio frequency module comprising:

a module substrate having a first main surface and a second main surface that are opposite to each other;

a plurality of external connection terminals that are disposed on the second main surface;

a first power amplifier circuit that is disposed on the first main surface and supports a first power class;

a second power amplifier circuit that is disposed on the first main surface and supports a second power class;

a first transformer that is connected to the first power amplifier circuit and disposed on the first main surface; and a second transformer that is connected to the second power amplifier circuit and disposed on the second main surface, wherein the second power class is defined by a maximum output power higher than power class 3, and wherein the first power class is defined by a maximum output power lower than the second power class or the same maximum output power as the second power class.

<2>

The radio frequency module according to <1>, wherein the first power amplifier circuit is a differential-amplifier-type power amplifier circuit, and wherein the second power amplifier circuit is a Doherty-type power amplifier circuit.

<3>

The radio frequency module according to <1>, further comprising:

a first filter circuit that is disposed on the first main surface and connected to the first transformer; and a second filter circuit that is disposed on the first main surface and connected to the second transformer, wherein a pass band of the first filter circuit includes a transmission band of a first band for time division duplex, and wherein a pass band of the second filter circuit includes a transmission band of a second band for frequency division duplex.

<4>

The radio frequency module according to <3>, further comprising:

a third filter circuit that is disposed on the first main surface and connected to the second transformer; and a switch circuit that is disposed on the second main surface and connected between the second transformer, the second filter circuit, and the third filter circuit, wherein the plurality of external connection terminals include a ground terminal disposed between the second transformer and the switch circuit.

<5>

The radio frequency module according to <1>, further comprising:

a first filter circuit that is disposed on the first main surface and connected to the first transformer; and a second filter circuit that is disposed on the first main surface and connected to the second transformer, wherein a pass band of the first filter circuit includes a transmission band of a first band for frequency division duplex, and wherein a pass band of the second filter circuit includes a transmission band of a second band for time division duplex.

<6>

The radio frequency module according to <1>, further comprising:

a first filter circuit that is disposed on the first main surface and connected to the first transformer; and a second filter circuit that is disposed on the first main surface and connected to the second transformer, wherein a pass band of each of the first filter circuit and the second filter circuit includes a transmission band of a first band, wherein, in a case where a third power class that is defined by a maximum output power higher than the second power class is applied to the first band, radio frequency signals of the first band are amplified at the same time by the first power amplifier circuit and the second power amplifier circuit, and wherein, in a case where the second power class is applied to the first band, a radio frequency signal of the first band is amplified by the second power amplifier circuit but is not amplified by the first power amplifier circuit.

<7>

The radio frequency module according to <6>, further comprising:

a metal member that is disposed on the first main surface and disposed between the first transformer and the second power amplifier circuit in plan view of the module substrate.

<8>

The radio frequency module according to <6> or <7>, wherein the plurality of external connection terminals include a ground terminal disposed between the second transformer and the first power amplifier circuit in plan view of the module substrate.

<9>

The radio frequency module according to any one of <1> to <8>, further comprising:

a low noise amplifier circuit; and an inductor that is connected to the low now amplifier circuit and disposed on the first main surface, wherein the first transformer is disposed farther away from the inductor than the second transformer is.

<10>

The radio frequency module according to <9>, further comprising:

a metal member that is disposed on the first main surface and disposed between the first transformer and the inductor in plan view of the module substrate.

<11>

The radio frequency module according to <10>, further comprising:

a resin member that covers at least part of the first power amplifier circuit and the second power amplifier circuit that are disposed on the first main surface; and a shield layer that covers at least part of a surface of the resin member, wherein a tip of the metal member is connected to the shield layer.

<12>

The radio frequency module according to any one of <1> to <11>, further comprising:

a matching circuit that is connected to the second transformer and disposed on the first main surface, wherein the matching circuit and the second transformer overlap at least partially in plan view of the module substrate.

<13>

The radio frequency module according to any one of <1> to <12>, wherein the first transformer is formed at a plurality of first layers including the first main surface of the module substrate, wherein the second transformer is formed at a plurality of second layers including the second main surface of the module substrate, and wherein the plurality of first layers and the plurality of second layers do not overlap.

<14>

The radio frequency module according to any one of <1> to <12>, wherein the first transformer is formed at a plurality of first layers including the first main surface of the module substrate, wherein the second transformer is formed at a plurality of second layers including the second main surface of the module substrate, and wherein the plurality of first layers and the plurality of second layers overlap at least partially.

<15>

The radio frequency module according to any one of <1> to <14>, wherein the second transformer and the first transformer do not overlap in plan view of the module substrate.

<16>

The radio frequency module according to any one of <1> to <14>, wherein the second transformer and the first transformer overlap at least partially in plan view of the module substrate.

<17>

The radio frequency module according to <16>, wherein the first transformer and the second transformer are disposed between the first power amplifier circuit and the second power amplifier circuit in plan view of the module substrate.

The present disclosure can be widely used, as a radio frequency module arranged in a front end part, for communication equipment such as a mobile phone.

What is claimed is:

1. A radio frequency module comprising:

a module substrate having a first main surface and a second main surface that are opposite to each other;

a plurality of external connection terminals that are disposed on the second main surface;

a first power amplifier circuit that is disposed on the first main surface and supports a first power class;

a second power amplifier circuit that is disposed on the first main surface and supports a second power class;

a first transformer that is connected to the first power amplifier circuit and disposed on the first main surface; and a second transformer that is connected to the second power amplifier circuit and disposed on the second main surface, wherein the second power class is defined by a maximum output power higher than power class 3, and wherein the first power class is defined by a maximum output power lower than the second power class or the same maximum output power as the second power class.

2. The radio frequency module according to claim 1, wherein the first power amplifier circuit is a differential-amplifier-type power amplifier circuit, and wherein the second power amplifier circuit is a Doherty-type power amplifier circuit.

3. The radio frequency module according to claim 1, further comprising:

a first filter circuit that is disposed on the first main surface and connected to the first transformer; and a second filter circuit that is disposed on the first main surface and connected to the second transformer, wherein a pass band of the first filter circuit includes a transmission band of a first band for time division duplex, and wherein a pass band of the second filter circuit includes a transmission band of a second band for frequency division duplex.

4. The radio frequency module according to claim 3, further comprising:

a third filter circuit that is disposed on the first main surface and connected to the second transformer; and a switch circuit that is disposed on the second main surface and connected between the second transformer, the second filter circuit, and the third filter circuit, wherein the plurality of external connection terminals include a ground terminal disposed between the second transformer and the switch circuit.

5. The radio frequency module according to claim 1, further comprising:

a first filter circuit that is disposed on the first main surface and connected to the first transformer; and a second filter circuit that is disposed on the first main surface and connected to the second transformer, wherein a pass band of the first filter circuit includes a transmission band of a first band for frequency division duplex, and wherein a pass band of the second filter circuit includes a transmission band of a second band for time division duplex.

6. The radio frequency module according to claim 1, further comprising:

a first filter circuit that is disposed on the first main surface and connected to the first transformer; and a second filter circuit that is disposed on the first main surface and connected to the second transformer, wherein a pass band of each of the first filter circuit and the second filter circuit includes a transmission band of a first band, wherein, in a case where a third power class that is defined by a maximum output power higher than the second power class is applied to the first band, radio frequency signals of the first band are amplified at the same time by the first power amplifier circuit and the second power amplifier circuit, and wherein, in a case where the second power class is applied to the first band, a radio frequency signal of the first band is amplified by the second power amplifier circuit but is not amplified by the first power amplifier circuit.

7. The radio frequency module according to claim 6, further comprising:

a metal member that is disposed on the first main surface and disposed between the first transformer and the second power amplifier circuit in plan view of the module substrate.

8. The radio frequency module according to claim 7, wherein the plurality of external connection terminals include a ground terminal disposed between the second transformer and the first power amplifier circuit in plan view of the module substrate.

9. The radio frequency module according to claim 7, further comprising:

a low noise amplifier circuit; and an inductor that is connected to the low now amplifier circuit and disposed on the first main surface, wherein the first transformer is disposed farther away from the inductor than the second transformer is.

10. The radio frequency module according to claim 9, further comprising:

a metal member that is disposed on the first main surface and disposed between the first transformer and the inductor in plan view of the module substrate.

11. The radio frequency module according to claim 10, further comprising:

a resin member that covers at least part of the first power amplifier circuit and the second power amplifier circuit that are disposed on the first main surface; and a shield layer that covers at least part of a surface of the resin member, wherein a tip of the metal member is connected to the shield layer.

12. The radio frequency module according to claim 7, further comprising:

a matching circuit that is connected to the second transformer and disposed on the first main surface, wherein the matching circuit and the second transformer overlap at least partially in plan view of the module substrate.

13. The radio frequency module according to claim 7, wherein the first transformer is formed at a plurality of first layers including the first main surface of the module substrate, wherein the second transformer is formed at a plurality of second layers including the second main surface of the module substrate, and wherein the plurality of first layers and the plurality of second layers do not overlap.

14. The radio frequency module according to claim 7, wherein the first transformer is formed at a plurality of first layers including the first main surface of the module substrate, wherein the second transformer is formed at a plurality of second layers including the second main surface of the module substrate, and wherein the plurality of first layers and the plurality of second layers overlap at least partially.

15. The radio frequency module according to claim 7, wherein the second transformer and the first transformer do not overlap in plan view of the module substrate.

16. The radio frequency module according to claim 7, wherein the second transformer and the first transformer overlap at least partially in plan view of the module substrate.

17. The radio frequency module according to claim 16, wherein the first transformer and the second transformer are disposed between the first power amplifier circuit and the second power amplifier circuit in plan view of the module substrate.

18. The radio frequency module according to claim 6, wherein the plurality of external connection terminals include a ground terminal disposed between the second transformer and the first power amplifier circuit in plan view of the module substrate.

19. The radio frequency module according to claim 18, further comprising:

a low noise amplifier circuit; and an inductor that is connected to the low now amplifier circuit and disposed on the first main surface, wherein the first transformer is disposed farther away from the inductor than the second transformer is.

20. The radio frequency module according to claim 19, further comprising:

a metal member that is disposed on the first main surface and disposed between the first transformer and the inductor in plan view of the module substrate;

a resin member that covers at least part of the first power amplifier circuit and the second power amplifier circuit that are disposed on the first main surface; and a shield layer that covers at least part of a surface of the resin member, wherein a tip of the metal member is connected to the shield layer.

* * * * *